(12) United States Patent
Hanis et al.

(10) Patent No.: US 12,304,377 B2
(45) Date of Patent: May 20, 2025

(54) SYSTEMS AND METHODS FOR VENTING TANKS TO ENHANCE TRANSPORTING ASPHALT

(71) Applicant: MARATHON PETROLEUM COMPANY LP, Findlay, OH (US)

(72) Inventors: Jared S. Hanis, Findlay, OH (US); Eddie A. Davis, Findlay, OH (US); James E. Calen, Findlay, OH (US); Stuart B. Dunkerley, Findlay, OH (US); William Y. Nakahara, Findlay, OH (US)

(73) Assignee: MARATHON PETROLEUM COMPANY LP, Findlay, OH (US)

( * ) Notice: Subject to any disclaimer, the term of this patent is extended or adjusted under 35 U.S.C. 154(b) by 197 days.

(21) Appl. No.: 16/984,559

(22) Filed: Aug. 4, 2020

(65) Prior Publication Data

US 2021/0362637 A1 Nov. 25, 2021

Related U.S. Application Data

(60) Provisional application No. 62/704,668, filed on May 21, 2020.

(51) Int. Cl.
*B60P 3/22* (2006.01)
*F16K 37/00* (2006.01)

(52) U.S. Cl.
CPC ........... *B60P 3/2255* (2013.01); *B60P 3/2205* (2013.01); *B60P 3/226* (2013.01); *F16K 37/0058* (2013.01); *F16K 37/0066* (2013.01)

(58) Field of Classification Search
CPC ........ B60P 3/2255; B60P 3/2205; B60P 3/226
See application file for complete search history.

(56) References Cited

U.S. PATENT DOCUMENTS 2,027,404 A 1/1936 Small
2,102,124 A * 12/1937 Lithgow ................ B61D 5/008
280/832

(Continued)

FOREIGN PATENT DOCUMENTS

CA 1262976 11/1989
CN 2871674 2/2007

(Continued)

OTHER PUBLICATIONS

Emco Wheaton, Vapor Transfer Vents, 2020. https://www.gardnerdenver.com/en-us/emcowheaton/fuel-systems/tank-truck-equipment/vapor-transfer-vents.

(Continued)

*Primary Examiner* — Angelisa L. Hicks
(74) *Attorney, Agent, or Firm* — RAY QUINNEY & NEBEKER P.C.; Paul N. Taylor

(57) ABSTRACT

Systems and methods to vent a tank to enhance transporting asphalt when positioned in the tank may include connecting a vapor box to a tank. The vapor box may include one or more vents apertures and a valve associated with the one or more vent apertures and positioned to provide fluid flow between the interior of the vapor box and the exterior. The systems and methods may also include communication via a selector with the valve to cause the valve to switch between an open condition and a closed condition. The selector may be located remotely from the valve, and the systems and methods may also include communication with an indicator via one or more of the valve or the selector to provide an indication of one or more of the valve in the open condition or the valve in the closed condition.

31 Claims, 9 Drawing Sheets

(56) References Cited

U.S. PATENT DOCUMENTS

| | | | |
|---|---|---|---|
| 2,290,038 A * | 7/1942 | Folmsbee | B60P 3/22 |
| | | | 280/832 |
| 2,605,193 A | 7/1952 | Karll | |
| 2,850,436 A | 9/1958 | Beuther | |
| 2,877,129 A | 3/1959 | Hardman | |
| 2,906,635 A | 9/1959 | Teot | |
| 3,047,414 A | 7/1962 | Katz | |
| 3,072,284 A | 1/1963 | Luhman | |
| 3,162,101 A | 12/1964 | Rostler | |
| 3,221,615 A | 12/1965 | McGovern | |
| 3,238,173 A | 3/1966 | Bailey | |
| 3,261,269 A | 7/1966 | McGovern | |
| 3,344,056 A | 9/1967 | Rostler | |
| 3,432,321 A | 3/1969 | Rostler | |
| 3,556,827 A | 1/1971 | McConnaughay | |
| 3,867,111 A | 2/1975 | Knowles | |
| 3,955,416 A | 5/1976 | Waiwood | |
| 3,992,340 A | 11/1976 | Bonitz | |
| 4,064,826 A * | 12/1977 | Pauli | F25B 41/006 |
| | | | 116/276 |
| 4,073,625 A | 2/1978 | Kiritani et al. | |
| 4,082,823 A | 4/1978 | Augustine | |
| 4,084,915 A | 4/1978 | Wiseblood | |
| 4,112,765 A | 9/1978 | Hollweck | |
| 4,130,474 A | 12/1978 | Anthony | |
| 4,145,322 A | 3/1979 | Maldonado | |
| 4,154,710 A | 5/1979 | Maldonado | |
| 4,162,999 A | 7/1979 | Bohemen | |
| 4,237,052 A | 12/1980 | Fitoussi | |
| 4,242,246 A | 12/1980 | Maldonado | |
| 4,320,788 A | 3/1982 | Lord | |
| 4,323,496 A | 4/1982 | Mitani | |
| 4,330,449 A | 5/1982 | Maldonado | |
| 4,373,961 A | 2/1983 | Stone | |
| 4,392,870 A | 7/1983 | Chieffo | |
| 4,541,735 A | 9/1985 | Abu-Isa | |
| 4,549,834 A | 10/1985 | Allen | |
| 4,554,313 A | 11/1985 | Hagenbach | |
| 4,564,834 A | 1/1986 | Steele | |
| 4,585,816 A | 4/1986 | Vitkuske | |
| 4,647,313 A | 3/1987 | Clementoni | |
| 4,762,565 A | 8/1988 | Graf | |
| 4,789,946 A | 12/1988 | Sinz | |
| 4,971,219 A | 11/1990 | Dombeck et al. | |
| 5,008,653 A | 4/1991 | Kidd | |
| 5,023,282 A | 6/1991 | Neubert | |
| 5,039,342 A | 8/1991 | Jelling | |
| 5,050,603 A | 9/1991 | Stokes | |
| 5,083,870 A | 1/1992 | Sindelar et al. | |
| 5,118,733 A | 6/1992 | Gelles | |
| 5,120,777 A | 6/1992 | Chaverot | |
| 5,177,130 A | 1/1993 | Beavers | |
| 5,180,428 A | 1/1993 | Koleas | |
| 5,234,494 A | 8/1993 | Sawatzky et al. | |
| 5,472,928 A | 12/1995 | Scheuerman et al. | |
| 5,498,327 A | 3/1996 | Stangeland et al. | |
| 5,511,573 A | 4/1996 | Corte | |
| 5,559,166 A | 9/1996 | Bearden | |
| 5,589,057 A | 12/1996 | Trimble et al. | |
| 5,601,697 A | 2/1997 | Miller | |
| 5,660,715 A | 8/1997 | Trimble et al. | |
| 5,681,369 A | 10/1997 | Osborne | |
| 5,766,333 A | 6/1998 | Lukens | |
| 5,816,708 A | 10/1998 | Urich | |
| 5,853,455 A | 12/1998 | Gibson | |
| 5,911,817 A | 6/1999 | Hayner | |
| 5,916,529 A | 6/1999 | Scheuerman | |
| 5,938,130 A | 8/1999 | Zickell | |
| 5,966,311 A | 10/1999 | Stemporzewski, Jr. | |
| 6,001,162 A | 12/1999 | Hayner | |
| 6,015,440 A | 1/2000 | Noureddini | |
| 6,048,447 A | 4/2000 | Hayner | |
| 6,074,128 A | 6/2000 | Marino | |
| 6,083,988 A | 7/2000 | Becker | |
| 6,086,749 A | 7/2000 | Kramer et al. | |
| 6,133,351 A | 10/2000 | Hayner | |
| 6,153,004 A | 11/2000 | Hayner | |
| 6,156,113 A | 12/2000 | Pasquier | |
| 6,174,501 B1 | 1/2001 | Noureddini | |
| 6,203,585 B1 | 3/2001 | Majerczak | |
| 6,214,103 B1 | 4/2001 | Kitagawa | |
| 6,223,789 B1 | 5/2001 | Koch | |
| 6,235,104 B1 | 5/2001 | Chattopadhyay | |
| 6,249,241 B1 | 6/2001 | Jordan et al. | |
| 6,290,152 B1 | 9/2001 | Zickell | |
| 6,318,402 B1 | 11/2001 | Ladeira | |
| 6,336,479 B1 | 1/2002 | Nanaji | |
| 6,348,074 B2 | 2/2002 | Wenzel | |
| 6,352,637 B1 | 3/2002 | Doolin et al. | |
| 6,380,284 B1 | 4/2002 | Lopez | |
| 6,384,112 B1 | 5/2002 | Boussad | |
| 6,394,149 B1 | 5/2002 | Parsons | |
| 6,414,056 B1 | 7/2002 | Puzic | |
| 6,414,066 B1 | 7/2002 | Lem | |
| 6,416,249 B1 | 7/2002 | Crupi | |
| 6,417,421 B1 | 7/2002 | Yao | |
| 6,514,331 B2 | 2/2003 | Varnadoe et al. | |
| 6,514,332 B2 | 2/2003 | Varnadoe et al. | |
| 6,548,580 B1 | 4/2003 | Rohde | |
| 6,575,326 B2 * | 6/2003 | Martin, Jr. | B65D 90/34 |
| | | | 220/374 |
| 6,615,658 B2 | 9/2003 | Snelling | |
| 6,659,684 B1 | 12/2003 | Goodhart et al. | |
| 6,749,677 B2 | 6/2004 | Freisthler | |
| 6,764,542 B1 | 7/2004 | Lackey | |
| 6,776,832 B2 | 8/2004 | Spence et al. | |
| 6,802,897 B1 | 10/2004 | Lackey | |
| 6,852,779 B1 | 2/2005 | Planche | |
| 6,927,245 B2 | 8/2005 | Buras et al. | |
| 6,932,123 B1 | 8/2005 | Craig | |
| 6,935,387 B1 | 8/2005 | Blubaugh | |
| 6,948,364 B2 | 9/2005 | Snelling | |
| 6,952,996 B2 | 10/2005 | Sisk et al. | |
| 6,973,828 B2 | 12/2005 | Zimmermann | |
| 7,008,670 B1 | 3/2006 | Freisthler | |
| 7,028,382 B2 * | 4/2006 | Fisher | B65D 88/005 |
| | | | 29/455.1 |
| 7,041,717 B2 | 5/2006 | Margulis | |
| 7,047,114 B1 | 5/2006 | Rogers | |
| 7,241,821 B1 | 7/2007 | Hayner et al. | |
| 7,297,204 B2 | 11/2007 | Crews et al. | |
| 7,309,390 B2 | 12/2007 | Falkiewicz | |
| 7,357,594 B2 | 4/2008 | Takamura | |
| 7,417,081 B2 | 8/2008 | Nakajima et al. | |
| 7,503,724 B2 | 3/2009 | Blacklidge | |
| 7,568,835 B2 | 8/2009 | Pils | |
| 7,645,114 B2 | 1/2010 | Cannon et al. | |
| 7,811,372 B2 | 10/2010 | Nigen-Chaidron et al. | |
| 7,848,912 B2 | 12/2010 | Bertini | |
| 7,849,802 B2 * | 12/2010 | Dalrymple | B61D 5/08 |
| | | | 105/377.07 |
| 7,918,624 B2 | 4/2011 | Blacklidge | |
| 7,951,857 B2 | 5/2011 | Crews et al. | |
| 7,993,442 B2 | 8/2011 | Crews et al. | |
| 8,026,380 B2 | 9/2011 | Hassan et al. | |
| 8,193,401 B2 | 6/2012 | McGehee et al. | |
| 8,206,500 B1 | 6/2012 | Mathis et al. | |
| 8,278,451 B2 | 10/2012 | Becker et al. | |
| 8,286,673 B1 | 10/2012 | Recker et al. | |
| 8,316,708 B2 * | 11/2012 | Horst | G01P 13/008 |
| | | | 116/276 |
| 8,337,117 B2 | 12/2012 | Vitale et al. | |
| 8,404,037 B2 | 3/2013 | Naidoo et al. | |
| 8,454,979 B2 | 6/2013 | Mitarai et al. | |
| 8,634,970 B2 | 1/2014 | Lee et al. | |
| 8,722,771 B2 | 5/2014 | Vaidya et al. | |
| 8,783,280 B2 * | 7/2014 | Yandle, II | F16L 23/0286 |
| | | | 137/590 |
| 8,789,564 B2 | 7/2014 | Jividen et al. | |
| 8,814,464 B2 | 8/2014 | McDade et al. | |
| 8,821,064 B1 | 9/2014 | Morris et al. | |
| 8,859,649 B2 | 10/2014 | Ranka | |
| 8,926,742 B2 | 1/2015 | Coe | |
| 8,968,457 B2 | 3/2015 | Payne | |

(56) References Cited

U.S. PATENT DOCUMENTS

| | | |
|---|---|---|
| 8,979,982 B2 | 3/2015 | Jordan |
| 8,992,118 B2 | 3/2015 | Coe |
| 9,028,602 B2 | 5/2015 | Chughtai et al. |
| 9,115,295 B2 | 8/2015 | Deneuvillers et al. |
| 9,139,720 B2 | 9/2015 | Avramidis et al. |
| 9,139,733 B2 | 9/2015 | McDade et al. |
| 9,139,953 B2 | 9/2015 | Ahluwalia |
| 9,150,140 B2 | 10/2015 | Girard et al. |
| 9,295,992 B2 | 3/2016 | Zickell |
| 9,347,187 B2 | 5/2016 | Coe |
| 9,376,565 B2 | 6/2016 | Subotic et al. |
| 9,416,274 B2 | 8/2016 | Frank |
| 9,481,794 B2 | 11/2016 | Cox |
| 9,493,633 B2 | 11/2016 | Rowland et al. |
| 9,513,135 B2 | 12/2016 | MacNeille et al. |
| 9,523,003 B2 | 12/2016 | Williams et al. |
| 9,556,631 B2 | 1/2017 | Brooks et al. |
| 9,597,628 B2 | 3/2017 | Kummerer et al. |
| 9,650,580 B2 | 5/2017 | Merdrignac et al. |
| 9,790,360 B2 | 10/2017 | Puchalski et al. |
| 9,862,820 B2 | 1/2018 | Kim et al. |
| 9,868,855 B2 | 1/2018 | Merck et al. |
| 9,969,884 B2 | 5/2018 | Murthy et al. |
| 9,982,136 B2 | 5/2018 | Cao et al. |
| 10,030,145 B2 | 7/2018 | Severance et al. |
| 10,076,430 B2 | 9/2018 | Klausen |
| 10,127,515 B2 | 11/2018 | Borgerson et al. |
| 10,174,201 B2 | 1/2019 | Avramidis |
| 10,214,617 B1 | 2/2019 | Bruns et al. |
| 10,233,120 B2 | 3/2019 | Flanigan |
| 10,294,616 B2 | 5/2019 | Crupi et al. |
| 10,316,192 B2 | 6/2019 | Kurth et al. |
| 10,323,147 B1 | 6/2019 | Brewster et al. |
| 10,323,148 B1 | 6/2019 | Brewster et al. |
| 10,329,426 B2 | 6/2019 | Kurth et al. |
| 10,337,154 B2 | 7/2019 | Baumrind |
| 10,339,478 B2 | 7/2019 | Grant et al. |
| 10,363,529 B1 | 7/2019 | Alberty |
| 10,442,872 B2 | 10/2019 | Besse et al. |
| 10,449,502 B2 | 10/2019 | Rovani, Jr. et al. |
| 10,527,547 B2 | 1/2020 | Hofko et al. |
| 10,570,286 B2 | 2/2020 | Williams |
| 10,626,050 B2 | 4/2020 | Muncy et al. |
| 10,626,275 B2 | 4/2020 | Coe |
| 10,669,203 B2 | 6/2020 | Franzen et al. |
| 10,669,463 B2 | 6/2020 | Bahr |
| 10,724,183 B2 | 7/2020 | Coe |
| 10,767,033 B2 | 9/2020 | Kluttz et al. |
| 10,793,720 B2 | 10/2020 | Puchalski et al. |
| 10,794,017 B2 | 10/2020 | Coe |
| 10,889,940 B2 | 1/2021 | Crupi |
| 10,961,395 B2 | 3/2021 | Williams et al. |
| 10,982,097 B2 | 4/2021 | Larusso et al. |
| 10,988,617 B2 | 4/2021 | McClellan, Jr. et al. |
| 11,077,045 B2 | 8/2021 | Sen et al. |
| 11,091,642 B2 | 8/2021 | Kurth et al. |
| 11,097,981 B2 | 8/2021 | Reinke et al. |
| 11,124,926 B2 | 9/2021 | Fennell et al. |
| 11,155,696 B2 | 10/2021 | Fini |
| 11,193,243 B2 | 12/2021 | Chesky |
| 11,225,576 B2 | 1/2022 | Jorda et al. |
| 11,365,318 B2 | 6/2022 | Kwon et al. |
| 11,390,750 B2 | 7/2022 | Baumgardner et al. |
| 11,414,549 B2 | 8/2022 | Allen et al. |
| 11,421,109 B2 | 8/2022 | McCurdy et al. |
| 11,427,697 B2 | 8/2022 | Reinke et al. |
| 11,447,637 B2 | 9/2022 | Gabel et al. |
| 11,512,437 B2 | 11/2022 | McDade |
| RE49,447 E | 3/2023 | Brewster et al. |
| 11,623,990 B2 | 4/2023 | Baumgardner |
| 11,634,875 B2 | 4/2023 | Fennell et al. |
| 11,655,419 B2 | 5/2023 | Nicholson |
| 11,732,108 B1 | 8/2023 | Hayner |
| 11,814,506 B2 | 11/2023 | Clopotel et al. |
| 2002/0026884 A1 | 3/2002 | Raad |
| 2007/0277430 A1 | 12/2007 | Jackman |
| 2009/0036694 A1 | 2/2009 | Hassan et al. |
| 2009/0056201 A1 | 3/2009 | Morgan |
| 2009/0127499 A1 | 5/2009 | Tran |
| 2009/0137705 A1 | 5/2009 | Faucon Dumont et al. |
| 2009/0226254 A1 | 9/2009 | Jones |
| 2010/0034586 A1 | 2/2010 | Bailey et al. |
| 2010/0048771 A1 | 2/2010 | Osborn |
| 2010/0062219 A1 | 3/2010 | Richards |
| 2010/0088142 A1 | 4/2010 | El-Bakry et al. |
| 2010/0020918 A1 | 8/2010 | Wiley |
| 2010/0280750 A1 | 11/2010 | Chen et al. |
| 2010/0289654 A1 | 11/2010 | Hunter |
| 2011/0105652 A1 | 5/2011 | Hergenrother |
| 2011/0233105 A1 | 9/2011 | Bailey |
| 2012/0017804 A1 | 1/2012 | Venema et al. |
| 2012/0060722 A1 | 3/2012 | Montpeyroux et al. |
| 2013/0197134 A1 | 8/2013 | Leal et al. |
| 2013/0276668 A1 | 10/2013 | Ranka et al. |
| 2013/0344012 A1 | 12/2013 | Cohen |
| 2014/0270953 A1 | 9/2014 | Duffy |
| 2014/0284520 A1 | 9/2014 | Hategan |
| 2014/0310049 A1 | 10/2014 | Goel |
| 2014/0343192 A1 | 11/2014 | Cochran et al. |
| 2014/0356526 A1 | 12/2014 | O'Connell et al. |
| 2015/0012326 A1 | 1/2015 | Furman |
| 2015/0087753 A1 | 3/2015 | Koleas et al. |
| 2015/0307013 A1 | 10/2015 | Tremblay et al. |
| 2016/0052169 A1 | 2/2016 | Baumrind et al. |
| 2016/0122507 A1 | 5/2016 | Cox |
| 2016/0194581 A1 | 7/2016 | Phillips |
| 2016/0236980 A1 | 8/2016 | Mullenbach et al. |
| 2016/0289452 A1 | 10/2016 | O'Connell et al. |
| 2016/0362338 A1 | 12/2016 | Reinke et al. |
| 2016/0376440 A1 | 12/2016 | Naidoo et al. |
| 2017/0096092 A1* | 4/2017 | Cannon ................ B60P 3/2215 |
| 2017/0107376 A1 | 4/2017 | Winship et al. |
| 2017/0114281 A1 | 4/2017 | Gupta et al. |
| 2017/0152384 A1 | 6/2017 | Eijkenboom |
| 2017/0306570 A1 | 11/2017 | Crupi et al. |
| 2017/0349725 A1 | 12/2017 | Broere |
| 2017/0370899 A1 | 12/2017 | Porot et al. |
| 2018/0010305 A1 | 1/2018 | Bentaj et al. |
| 2018/0032926 A1 | 2/2018 | DeLuca |
| 2018/0044529 A1 | 2/2018 | Kurth et al. |
| 2018/0112303 A1 | 4/2018 | Antony |
| 2018/0148575 A1 | 5/2018 | Kurth et al. |
| 2018/0200264 A1 | 7/2018 | Blau et al. |
| 2018/0266578 A1 | 9/2018 | Baxter |
| 2018/0060808 A1 | 11/2018 | Borgerson et al. |
| 2018/0340068 A1 | 11/2018 | McCurdy et al. |
| 2018/0371251 A1 | 12/2018 | Avramidis et al. |
| 2019/0016965 A1 | 1/2019 | Aldous |
| 2019/0048191 A1 | 2/2019 | Leon et al. |
| 2019/0153229 A1 | 5/2019 | Reinke et al. |
| 2019/0300714 A1 | 10/2019 | Watson et al. |
| 2019/0375940 A1 | 12/2019 | Franzen et al. |
| 2020/0002538 A1 | 1/2020 | Wissel et al. |
| 2020/0032063 A1 | 1/2020 | Lungren et al. |
| 2020/0094924 A1 | 3/2020 | Gaziotis et al. |
| 2020/0118068 A1 | 4/2020 | Turetsky et al. |
| 2020/0123449 A1 | 4/2020 | Nicholson |
| 2020/0165459 A1 | 5/2020 | Williams et al. |
| 2020/0265377 A1 | 8/2020 | Al Dhaheri et al. |
| 2020/0277497 A1 | 9/2020 | Reinke et al. |
| 2020/0317925 A1 | 10/2020 | Hassan et al. |
| 2020/0332126 A1 | 10/2020 | Donelson |
| 2020/0372375 A1 | 11/2020 | Pathak et al. |
| 2021/0002484 A1 | 1/2021 | Clopotel |
| 2021/0017386 A1 | 1/2021 | Reinke et al. |
| 2021/0054210 A1 | 2/2021 | Hemsley et al. |
| 2021/0079224 A1 | 3/2021 | Cochran et al. |
| 2021/0095429 A1 | 4/2021 | Murphy et al. |
| 2021/0139374 A1 | 5/2021 | Bruns et al. |
| 2021/0147751 A1 | 5/2021 | Fini et al. |
| 2021/0189133 A1 | 6/2021 | Grzybowski |
| 2021/0214057 A1 | 7/2021 | Tsujimoto |
| 2021/0230255 A1 | 7/2021 | Amadoro et al. |
| 2021/0230818 A1 | 7/2021 | Fennell et al. |

(56) References Cited

U.S. PATENT DOCUMENTS

| | | |
|---|---|---|
| 2021/0236815 A1 | 8/2021 | Waldstreicher et al. |
| 2021/0238093 A1 | 8/2021 | Eyster |
| 2021/0241221 A1 | 8/2021 | Pathak et al. |
| 2021/0284574 A1 | 9/2021 | Kurth et al. |
| 2021/0338562 A1 | 11/2021 | Akthakul et al. |
| 2021/0371339 A1 | 12/2021 | Dennis et al. |
| 2021/0371567 A1 | 12/2021 | Vanderhoof et al. |
| 2022/0001345 A1 | 1/2022 | Ahn et al. |
| 2022/0002548 A1 | 1/2022 | Wissel et al. |
| 2022/0033305 A1 | 2/2022 | Cochran et al. |
| 2022/0089832 A1 | 3/2022 | Yi et al. |
| 2022/0101272 A1 | 3/2022 | Sunde et al. |
| 2022/0106537 A1 | 4/2022 | Aritake et al. |
| 2022/0112130 A1 | 4/2022 | Williams et al. |
| 2022/0153645 A1 | 5/2022 | Zhou |
| 2022/0243066 A1 | 8/2022 | Noel |
| 2022/0267602 A1 | 8/2022 | Cooley et al. |
| 2022/0315766 A1 | 10/2022 | Baumgardner et al. |
| 2022/0372257 A1 | 11/2022 | Coe |
| 2022/0389669 A1 | 12/2022 | Miller |
| 2022/0402819 A1 | 12/2022 | Mangel et al. |
| 2023/0033496 A1 | 2/2023 | Townsend et al. |
| 2023/0072410 A1 | 3/2023 | Inoubli et al. |
| 2023/0085865 A1 | 3/2023 | Bruns et al. |
| 2023/0086227 A1 | 3/2023 | Bruns et al. |
| 2023/0092077 A1 | 3/2023 | Lorenzen et al. |
| 2023/0193031 A1 | 6/2023 | Clopotel et al. |
| 2023/0193035 A1 | 6/2023 | Clopotel et al. |
| 2023/0348723 A1 | 11/2023 | Clopotel et al. |
| 2024/0409815 A1 | 12/2024 | Clopotel |

FOREIGN PATENT DOCUMENTS

| | | |
|---|---|---|
| CN | 106934143 A | 7/2017 |
| CN | 206917912 | 1/2018 |
| CN | 111879637 A | 11/2020 |
| CN | 111986520 A | 11/2020 |
| CN | 113110464 A | 7/2021 |
| CN | 113921091 A | 1/2022 |
| CN | 114112889 A | 3/2022 |
| CN | 114113552 A | 3/2022 |
| DE | 4124142 A1 | 1/1993 |
| DE | 9213661 | 1/1993 |
| DE | 19519539 A1 | 12/1995 |
| EP | 0870291 B1 | 10/1998 |
| EP | 2290010 A1 | 3/2011 |
| EP | 3291206 A1 | 3/2018 |
| EP | 3441260 | 2/2019 |
| FR | 2478122 | 9/1981 |
| GB | 2205104 A | 11/1988 |
| IN | 293683 | 3/2018 |
| KR | 10-2017-0011981 | 2/2017 |
| KR | 101952894 | 2/2019 |
| KR | 102195378 B1 | 12/2020 |
| KR | 102597632 B1 | 11/2023 |
| PL | 157791 | 7/1992 |
| RU | 1787994 | 1/1993 |
| RU | 2123719 C1 | 12/1998 |
| SU | 816996 A1 | 3/1981 |
| WO | 200055257 | 9/2000 |
| WO | 2007068461 A1 | 6/2007 |
| WO | 2009/147360 | 12/2009 |
| WO | 2011034423 | 3/2011 |
| WO | 20190234434 | 12/2019 |
| WO | 2021254815 A1 | 12/2021 |

OTHER PUBLICATIONS

Acromag, Whitepaper: Introduction to the Two-Wire Transmitter and the 4-20MA Current Loop, Nov. 8, 2010, available at http://www.automation.com/pdf-articles/Acromag-Intro-TwoWire-Transmitters-4-20mA-Current-Loop-904A.pdf.

Dataforth Corporation, Application Note: 4-20 mA Transmitters, May 24, 2002, available at http://www.dataforth.com/catalog/bb/152-138011998.pdf.

RAPTOR Overfill Protection Probe, TPF, Inc., Jun. 3, 2013, available at http://tpftherm.com/pdf/2TPFB.pdf.

Lee et al. A decision support system for vessel speed decision in maritime logistics using weather archive big data, 2017, Elsevier, Computers and Operations Research 98, 330-342 (Year: 2017).

Torralba A. et al, Paper 132—Smart Navigation System for the Port of Seville, Buenos Aires, Argentina, Sep. 7-11, 2015.

Etienne, Mary et al., Intelligent Maritime Modern Ships and Ports, Dell Technologies and Intel Corporation, May 2020.

Negenborn, Rudy et al., Smart Port, Smart ships and the changing maritime ecosystem, SmartPort, Sep. 2018.

Lind, Mikael et al., Sea Traffic Management—Beneficial for all Maritime Stakeholders, Transportation Research Procedia, Dec. 2016.

Xiao, Yi et al., Digital empowerment for shipping development: a framework for establishing a smart shipping index system, Maritime Policy & Management, Feb. 27, 2021.

Tian Zhe et al., The Development of Key Technologies in Applications of Vessels Connected to the Internet, Symmetry, 2017.

Van Westrenen et al., Maritime traffic management: a need for central coordination?, Springer-Verlag London Limited 2012.

Sun, Zhaojie et al., Investigation of the potential application of biodiesel by-product as asphalt modifer, Road Materials and Pavement Design 17(3):1-16, Oct. 2015.

\* cited by examiner

SYSTEMS AND METHODS FOR VENTING TANKS TO ENHANCE TRANSPORTING ASPHALT

CROSS REFERENCE TO RELATED APPLICATION

This application claims priority to and the benefit of U.S. Provisional Application No. 62/704,668, filed May 21, 2020, titled "SYSTEMS AND METHODS FOR VENTING TANKS TO ENHANCE TRANSPORTING ASPHALT", the entire disclosure of which is incorporated herein by reference.

TECHNICAL FIELD

The present disclosure relates to systems and methods for venting tanks, and more particularly, to systems and methods for venting tanks to enhance transporting asphalt.

BACKGROUND

Trailers used to transport asphalt between locations may include a manway and a manually openable manhole on top of the trailer to allow vapors to vent from the interior of the trailer and ambient air to enter the interior of the trailer as the asphalt is pumped from the trailer. This prevents trailer from collapsing or imploding due to the pressure inside the trailer dropping as the asphalt is pumped from the trailer. For some trailers, the manhole is closed during transport of the asphalt between locations to prevent the asphalt from sloshing out of the manhole as the trailer pitches and rolls during transport. Once the trailer reaches a delivery location, the driver must climb a ladder to reach the manway and manhole, which is many feet above the ground and may present a hazard to the driver. In addition, the manhole may be difficult to manually open due, for example, to fouling over time from the asphalt, which may provide an additional hazard to the driver while manually opening the manhole. In addition, hydrogen sulfide gas, which may be present inside the trailer, is released from the interior of the trailer when the manhole is opened, and the gas may also present a hazard to the driver while the driver is located at the manhole.

Accordingly, it can be seen that a need exists for systems and methods that reduce risk when transporting and off-loading asphalt from a trailer or tank. The present disclosure may address one or more of the above-referenced drawbacks, as well as other possible drawbacks.

SUMMARY

The present disclosure is generally directed to systems and methods for venting tanks to enhance transporting asphalt. For example, in some embodiments, a system to vent a tank to enhance transporting asphalt when positioned in the tank may include a vapor box to connect to a tank. The vapor box may include one or more vent apertures. The system may also include a valve associated with the one or more vent apertures and positioned to provide fluid flow between an interior of the vapor box and an exterior of the vapor box. The system may further include a selector positioned in communication with the valve to cause the valve to switch between an open condition providing fluid flow between the interior of the vapor box and the exterior of the vapor box via the one or more vent apertures and a closed condition preventing fluid flow between the interior of the vapor box and the exterior of the vapor box via the one or more vent apertures. The selector may be located remotely from the valve. The system may also include an indicator positioned in communication with one or more of the valve or the selector to provide an indication of one or more of the valve in the open condition or the valve in the closed condition.

According to some embodiments, a system to vent a tank to enhance transporting asphalt when positioned in the tank may include a vapor box to connect to a tank. The vapor box may include a cover including one or more vent apertures, and an inlet positioned to be connected to the tank and provide fluid flow between an interior of the tank and an interior of the vapor box. The vapor box may also include a barrier extending between the cover and the inlet. The cover, the inlet, and the barrier may at least partially define the interior of the vapor box. The system may also include a valve associated with the one or more vent apertures and positioned to provide fluid flow between the interior of the vapor box and an exterior of the vapor box. The system may further include a selector spaced from and positioned in communication with the valve and to cause the valve to change between an open condition providing fluid flow between the interior of the vapor box and the exterior of the vapor box via the one or more vent apertures and a closed condition preventing fluid flow between the interior of the vapor box and the exterior of the vapor box via the one or more vent apertures.

According to some embodiments, a tank to enhance transporting asphalt when positioned in the tank between geographic locations may include a tank defining an interior volume to contain a material and one or more material ports positioned to facilitate one or more of flowing material into the interior volume of the tank or flowing material out of the interior volume of the tank. The tank may also include one or more vent ports to facilitate venting the tank. The tank may also include one or more pairs of wheels connected to the tank to facilitate movement of the tank to enhance transporting material in the interior volume of the tank between geographic locations. The tank may further include a system to vent the tank. The system may include a vapor box connected to the tank, and the vapor box may include one or more vent apertures. The system may further include a valve associated with the one or more vent apertures and positioned to provide fluid flow between an interior of the vapor box and an exterior of the vapor box, and a selector positioned in communication with the valve and to cause the valve to switch between an open condition providing fluid flow between the interior of the vapor box and the exterior of the vapor box via the one or more vent apertures and a closed condition preventing fluid flow between the interior of the vapor box and the exterior of the vapor box via the one or more vent apertures.

According to some embodiments, a method for venting a tank from a location remote from a vent of the tank may include operating a selector positioned in communication with and remote from a valve associated with one or more vent apertures associated with the tank. The valve may be positioned to switch between an open condition providing fluid flow through the one or more vent apertures and a closed condition preventing fluid flow through the one or more vent apertures. The method may further include indicating via an indicator that the valve is in the open condition, the indicator being positioned in communication with one or more of the valve or the selector and positioned to provide an indication of one or more of the valve in the open condition or the valve in the closed condition.

Still other aspects, embodiments, and advantages of these exemplary embodiments and embodiments, are discussed in detail below. Moreover, it is to be understood that both the foregoing information and the following detailed description provide merely illustrative examples of various aspects and embodiments, and are intended to provide an overview or framework for understanding the nature and character of the claimed aspects and embodiments. Accordingly, these and other objects, along with advantages and features of the present invention herein disclosed, will become apparent through reference to the following description and the accompanying drawings. Furthermore, it is to be understood that the features of the various embodiments described herein are not mutually exclusive and can exist in various combinations and permutations.

BRIEF DESCRIPTION OF THE DRAWINGS

The accompanying drawings, which are included to provide a further understanding of the embodiments of the present disclosure, are incorporated in and constitute a part of this specification, illustrate embodiments of the present disclosure, and together with the detailed description, serve to explain principles of the embodiments discussed herein. No attempt is made to show structural details of this disclosure in more detail than can be necessary for a fundamental understanding of the embodiments discussed herein and the various ways in which they can be practiced. According to common practice, the various features of the drawings discussed below are not necessarily drawn to scale. Dimensions of various features and elements in the drawings can be expanded or reduced to more clearly illustrate embodiments of the disclosure.

DETAILED DESCRIPTION

Figure 1:
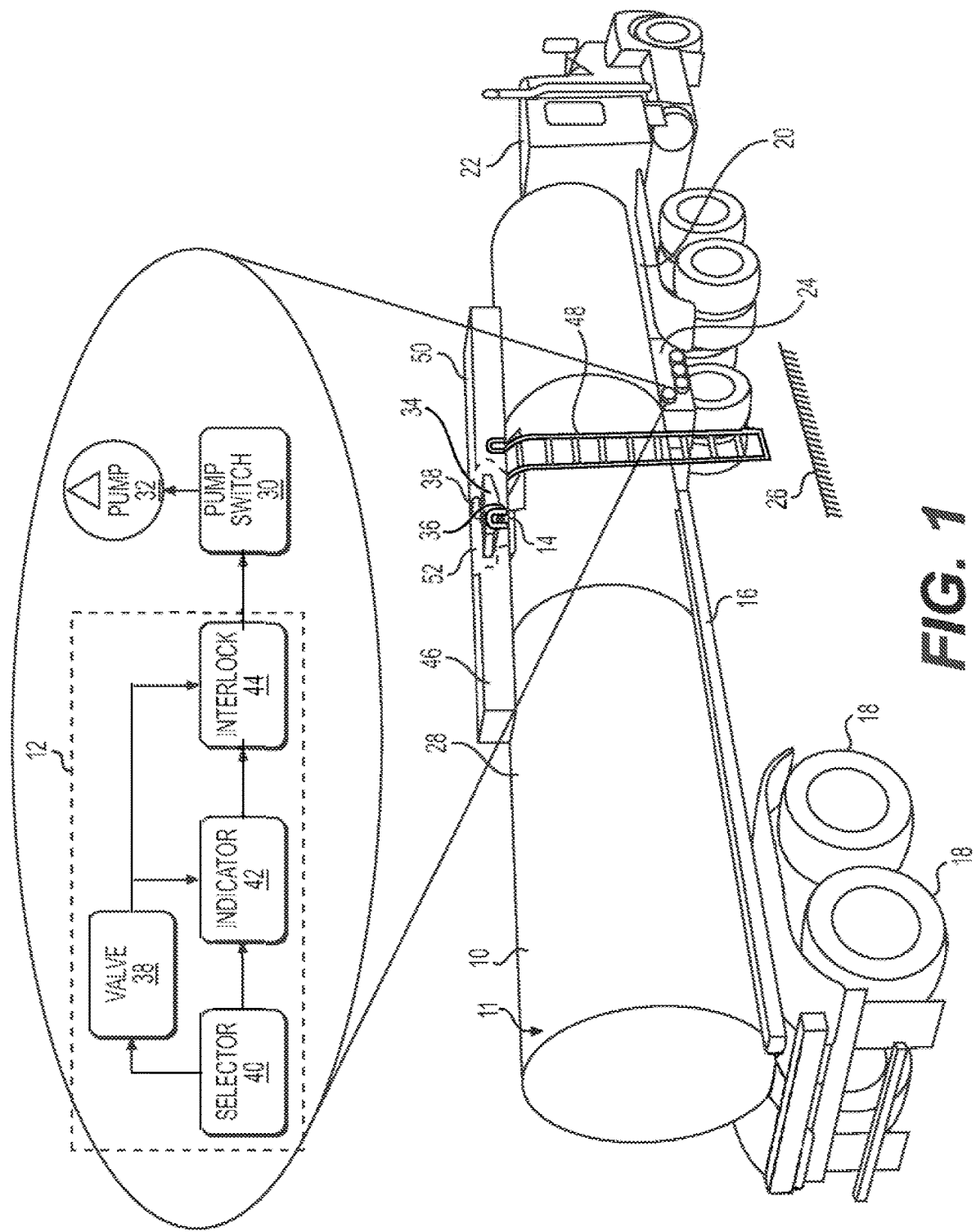
FIG. 1 is a perspective view of an example tank to enhance transporting asphalt and a schematic view of an example system to vent a tank according to embodiments of the disclosure.

Referring now to the drawings in which like numerals indicate like parts throughout the several views, the following description is provided as an enabling teaching of exemplary embodiments, and those skilled in the relevant art will recognize that many changes can be made to the embodiments described. It also will be apparent that some of the desired benefits of the embodiments described can be obtained by selecting some of the features of the embodiments without utilizing other features. Accordingly, those skilled in the art will recognize that many modifications and adaptations to the embodiments described are possible and can even be desirable in certain circumstances. Thus, the following description is provided as illustrative of the principles of the embodiments and not in limitation thereof.

The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to," unless otherwise stated. Thus, the use of such terms is meant to encompass the items listed thereafter, and equivalents thereof, as well as additional items. The transitional phrases "consisting of" and "consisting essentially of," are closed or semi-closed transitional phrases, respectively, with respect to any claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish claim elements.

FIG. 1 is a perspective view of an example tank 10 to enhance transporting asphalt when positioned in the tanks and a schematic view of an example system 12 to vent the tank 10 according to embodiments of the disclosure. Asphalt may include any known asphalt products including, or derived from, petroleum reserves. In some examples, the tank 10 may maintain the asphalt at a temperature greater than ambient temperature. As discussed herein, the tank 10 may include any type of container to hold and/or transport asphalt between two or more geographic locations. For example, the tank 10 may be at least partially filled with asphalt at a first geographic location, travel in either a self-propelled manner or pulled, pushed, or carried by a vehicle, such as a truck, locomotive, or aircraft, to one or more different geographic locations at which at least a portion of the asphalt is off-loaded, for example, via pumping.

In some examples, the tank 10 may define an interior volume 11 to receive, store, and/or carry asphalt, one or more material ports positioned to facilitate flowing asphalt into the interior volume 11 of the tank 10 or flowing material out of the interior volume 11 of the tank 10. The tank 10 may also include a vent port 14 (see also FIGS. 9-11) positioned to facilitate venting the tank 10, for example, during off-loading of asphalt from the tank 10. In some examples, the vent port 14 may be opened or allowed to provide fluid flow between the interior volume 11 of the tank 10 and the ambient surroundings, so that as asphalt is off-loaded from the tank 10, pressure inside the tank 10 may substantially equalize with the ambient or surrounding pressure to prevent the tank 10 from collapsing or imploding during the off-loading process.

In some examples, the tank 10 may include one or more pairs of wheels to facilitate transport of the tank 10 to enhance transporting asphalt in the interior volume 11 of the tank 10 between geographic locations. For example, as shown in FIG. 1, an example chassis 16 is connected to the tank 10 and one or more pairs of wheels 18 positioned to facilitate movement of the tank 10. The example shown in FIG. 1 also includes a coupling 20 connected to the chassis 16 and positioned to be connected to a truck 22 to move the tank 10 between geographic locations.

As schematically shown in FIG. 1, the tank 10 may also include a control panel 24, which may be positioned on or adjacent a side of the tank 10, for example, at a location to facilitate operation by an operator or driver while standing on a surface 26 supporting the tank 10 (e.g., the ground) to initiate off-loading of at least a portion of the asphalt, for example, without requiring the operator or driver to leave the surface 26 and/or climb onto the tank 10 or an upper surface 28 of the tank 10.

As schematically shown in FIG. 1, the control panel 24 may include one or more pump switches 30 positioned in communication with one or more pumps 32 positioned to off-load or pump at least a portion of the asphalt carried in the interior volume 11 of the tank 10 out of the tank 10, for example, into another reservoir or location, depending on, for example, the intended intermediate or end use. The one or more pump switches 30 and/or the one or more pumps 32 may be any known and/or suitable types of pump switches and/or pumps for off-loading or pumping the asphalt.

As schematically shown in FIG. 1, the example system 12 to vent the tank 10 may include a vapor box 34 connected to the tank 10. For example, the vent port 14 (see also FIGS. 9-11) of the tank 10 at, or in the vicinity of, the upper surface 28 of the tank 10, and the vapor box 34 may be connected or mounted to the upper surface 28 and define one or more vent apertures 36. The vent port 14 may be positioned to provide fluid flow between the interior volume 11 of the tank 10, and the vapor box 34 may be mounted to the tank 10, such that the one or more vent apertures 36 of the vapor box 34 may be provide fluid flow via the vent port 14 between the interior volume 11 of the tank 10 and the environment surrounding the tank 10.

As schematically shown in FIG. 1, the system 12 may include a valve 38 associated with the one or more vent apertures 36 and positioned to provide fluid flow between an interior of the vapor box 36 and an exterior of the vapor box 34, according to some embodiments of the disclosure. For example, the valve 38 may be configured to switch between an open condition providing fluid flow between the interior of the vapor box 34 and the exterior of the vapor box 34 via the one or more vent apertures 36 and a closed condition preventing fluid flow between the interior of the vapor box 34 and the exterior of the vapor box 34 via the one or more vent apertures 36. The valve 38 may be pneumatically operated, hydraulically operated, and/or electrically operated to switch between the open condition and the closed condition, for example, as explained herein.

As schematically shown in FIG. 1, the system 12 may also include a selector 40 positioned in communication with the valve 38 and to cause the valve 38 to switch between the open condition and the closed condition, according to some embodiments of the disclosure. For example, the selector 40 may include a switch (e.g., a physical switch and/or a virtual switch on a computer screen) that may be positioned on or adjacent the tank 10 at a location to facilitate operation by an operator or driver while standing on the surface 26 supporting the tank 10 (e.g., the ground) to initiate switching the valve 38 from the closed condition to the open condition, for example, as described herein. In some examples, the valve 38 may be switched to the open condition to facilitate off-loading (e.g., pumping) at least a portion of the asphalt out of the interior volume 11 of the tank 10. For example, prior to off-loading, the operator or driver may manipulate the selector 40 to cause the valve 38 to change to the open condition. Thereafter, the operator or driver may manipulate the pump switch 30 to cause one of more of the pumps 32 to pump at least a portion of the asphalt from the tank 10.

Because the valve 38 is in the open condition, the pressure in the tank 10 may substantially equalize with the ambient pressure outside the tank 10 during pumping of the asphalt, thereby preventing the tank from imploding or collapsing due to a pressure drop inside the interior volume 11 of the tank 10 during pumping. In addition, in some examples, because the operator or driver is able to cause the valve 38 to change to the open condition while standing on the surface 26, the operator or driver does not need to climb to the upper surface 28 of the tank 10, thereby reducing risk of injury to the operator or driver. In addition, in some examples, because the operator or driver is on the surface 26, the operator or driver is not directly exposed to hydrogen sulfide gas, which may be present inside the tank 10 and which may be released from the interior volume 11 of the tank 10 when the valve 38 is switched to the open condition, thereby reducing another potential hazard to the operator or driver.

As shown in FIG. 1, some examples of the system 12 may include an indicator 42 positioned in communication with one or more of the valve 38 or the selector 40 to provide an indication that the valve 38 is in the open condition and/or the valve 38 is in the closed condition. In some examples, the indicator 42 may be positioned to provide an indication that the valve 38 is in a substantially or fully open condition in contrast with the valve 38 being in a slightly, partially, halfway, or slightly more than halfway open condition. For example, because it is not necessary for the operator or driver to climb to the upper surface 28 of the tank 10 to open the valve 38 and/or access the vent port 14 of the tank 10, it may be impractical or inconvenient for the operator to confirm that the valve 38 is in an at least substantially or fully open condition. Thus, in some examples, the indicator 42 may be positioned on or adjacent the tank 10 at a location to facilitate receipt of the indication by an operator or driver while standing on the surface 26 supporting the tank 10 (e.g., at ground level), for example, at a location near the pump switch 30 for convenience. In addition, because the valve 38 may be fouled by the asphalt, for example, if some of the asphalt comes in contact with the valve 38 during transport of the asphalt due to sloshing and/or splashing, operation of the selector 40 may result in the valve 38 only partially opening. If the valve 38 only partially opens and the amount of opening is insufficient to allow a sufficient equalizing of pressure between inside the interior volume 11 of the tank 10 and the ambient pressure surrounding the tank 10 during pumping of asphalt from the tank 10, the tank 10 may be damaged, at least partially implode, or at least partially collapse. Thus, in some examples, the indicator 42 may be positioned to indicate the valve 38 is in the open condition, only if the valve 38 is sufficiently open to prevent damage, at least partial implosion, and/or at least partial collapse of the tank 10. In some examples, the indicator 42 may be positioned receive a signal (e.g., a pneumatic, hydraulic, and/or electric signal) via the valve 38 and/or via the selector 40, for example, as described herein.

As shown in FIG. 1, the system 12 may in some examples include an interlock 44 positioned to prevent operation of the one or more pumps 32, unless the valve 38 is sufficiently open to prevent damage to the tank 10 during pumping of asphalt from the tank 10. For example, the interlock 44 may prevent operation of the pump switch 30 and/or prevent the pump switch 30 from activating the one or more pumps 32 (e.g., by preventing an activation signal from the pump switch 30 from activating the one or more pumps 32). The interlock 44 may include a physical interlock, for example, an actuator connected to a latch or rod that prevents operation of the pump switch 30 by the operator or driver, and/or an electrical interlock, for example, an electric signal that prevents activation of the one or more pumps 32. Other types of interlocks are contemplated.

As shown in FIG. 1, in some examples, the vapor box 34 may be mounted on the upper surface 28 of the tank 10 in the vicinity of a platform or manway 46, also on the upper surface 28 of the tank 10. The platform or manway 46 may be positioned to provide support for an operator or driver to access the upper surface 28, for example, during filling of the tank 10 and/or to access the vent port 14. In some examples, the tank 10 may include a ladder 48 connected to the side of the tank 10 for the operator or driver to climb to reach the upper surface 28 and the platform or manway 46.

As schematically depicted, in some examples, of the system 12, the vapor box 34, and/or the platform or manway 46 may be positioned, such that the highest point of the vapor box 34 and/or the valve 38 is below an upper surface or highest point 50 of the platform or manway 46. For example, the vapor box 34 and/or valve 38 may be positioned in a recess 52 in the platform or manway 46, such that the highest point of the vapor box 34 and/or the valve 38 is below the upper surface or highest point 50 of the platform or manway 46 (see also FIGS. 9-11). This may reduce or prevent damage to the valve 38 and/or the vapor box 34 that might occur if the tank 10 were to overturn during an accident or strike an overhead object such as a walkway or bridge under which the tank 10 is travelling. This, in turn, may reduce the likelihood and/or prevent unintended release of asphalt from the tank 10 into the environment during such accidents or incidents.

Figure 2:
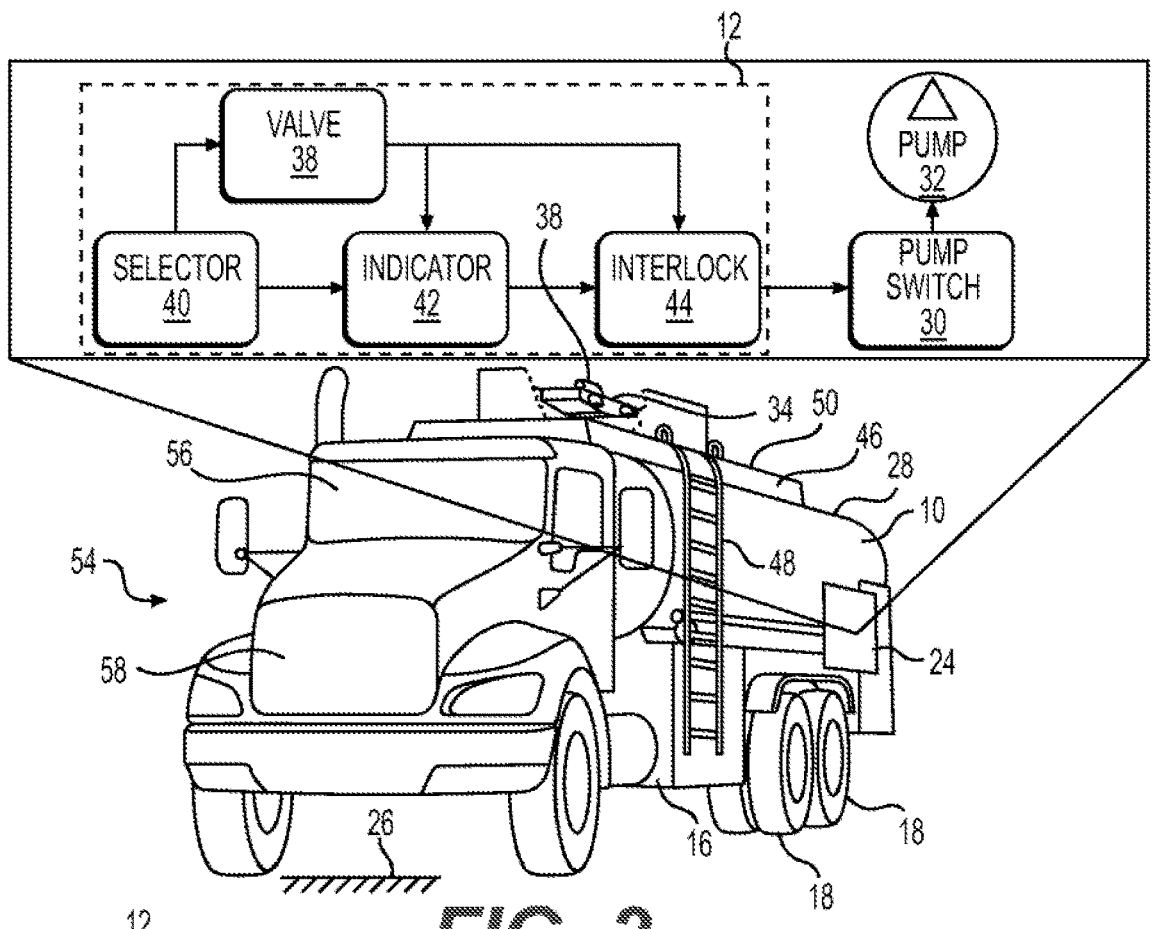
FIG. 2 is a perspective view of another example tank to enhance transporting asphalt and a schematic view of an example system to vent a tank according to embodiments of the disclosure.

FIG. 2 is a perspective view of another example tank 10 to enhance transporting asphalt and a schematic view of an example system 12 to vent a tank 10 according to embodiments of the disclosure. In the example shown in FIG. 2, the tank 10 is connected to chassis 16 of a truck 54 including a cab 56 and a power source 58 to provide torque for propelling the tank 10 between geographic locations and transporting the asphalt. In some examples, the system 12 shown in FIG. 2, may have at least some features in common with the system 12 shown and described with respect to FIG. 1.

Figure 3:
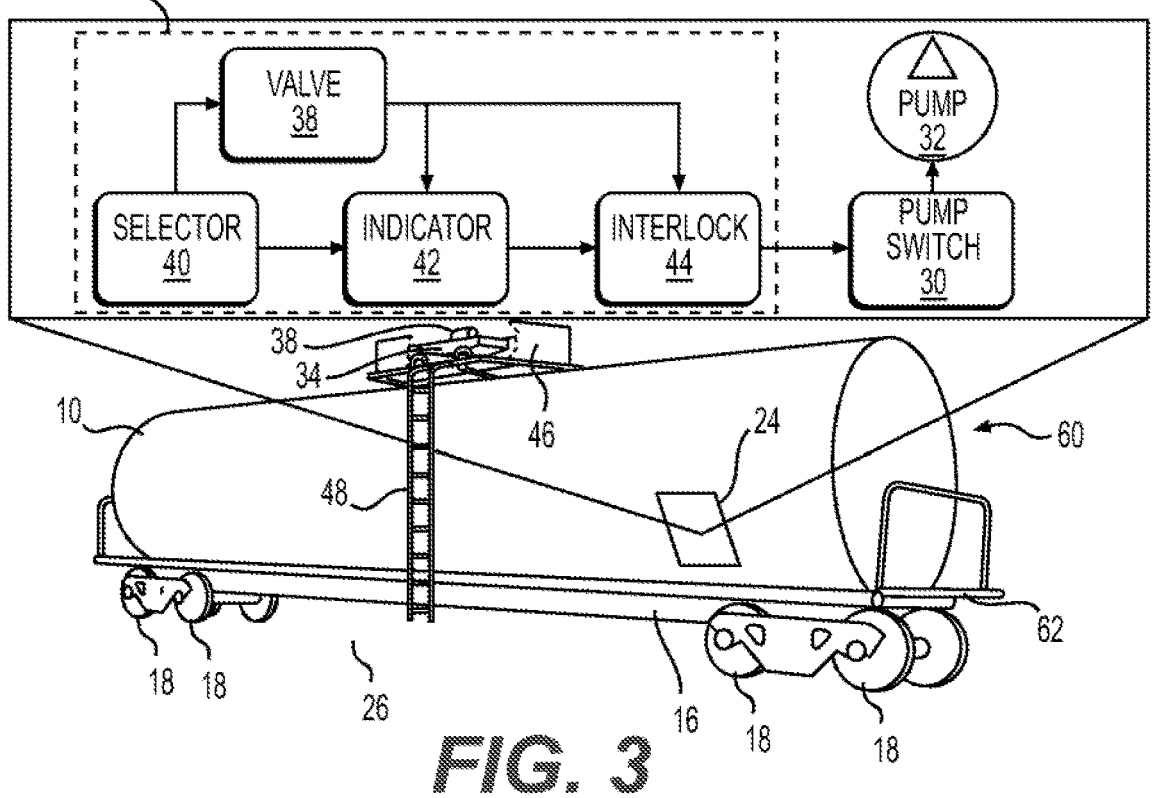
FIG. 3 is a perspective view of yet another example tank to enhance transporting asphalt and a schematic view of an example system to vent a tank according to embodiments of the disclosure.

FIG. 3 is a perspective view of yet another example tank 10 to enhance transporting asphalt and a schematic view of an example system 12 to vent a tank 10 according to embodiments of the disclosure. In the example shown in FIG. 3, the tank 10 is connected to a chassis 16 of a railcar 60 to enhance transporting the asphalt when positioned in the tank and having at least one rail coupling 62 to connect the railcar 60 to at least one other railcar and/or a locomotive. In some examples, the system 12 shown in FIG. 3, may have at least some features in common with the system 12 shown and described with respect to FIG. 1.

Figure 4:
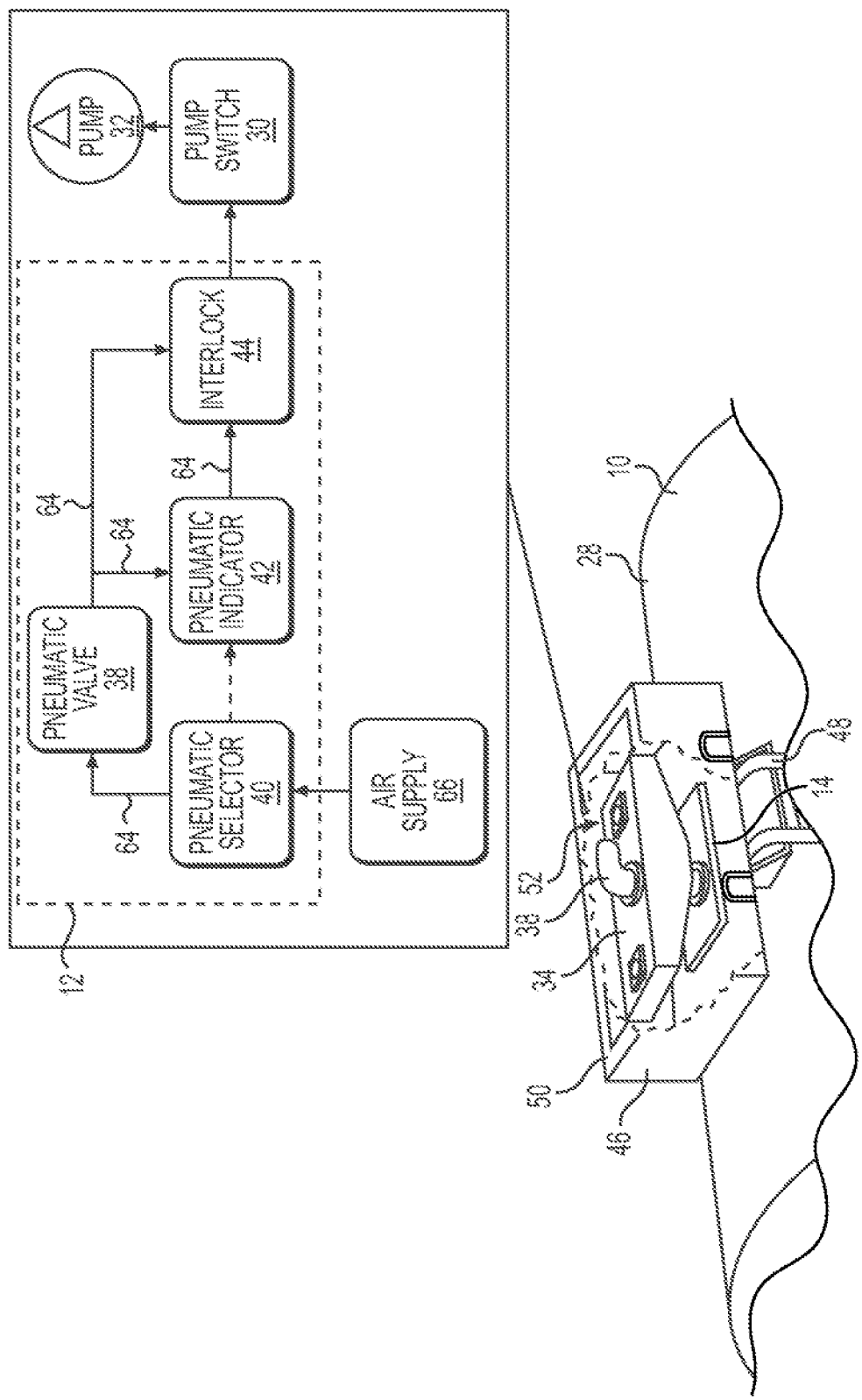
FIG. 4 is a partial perspective view of another example tank to enhance transporting asphalt and a schematic view of another example system to vent a tank according to embodiments of the disclosure.

FIG. 4 is a partial perspective view of another example tank 10 to enhance transporting asphalt and a schematic view of another example system 12 to vent a tank 10 according to embodiments of the disclosure. In the example shown in FIG. 4, the system 12 includes a selector communication conduit 64 between the valve 38 and the selector 40. The selector communication conduit 64 may include one or more of a pneumatic conduit, a hydraulic conduit, or an electrical conduit, for example, as explained herein. For example, in FIG. 4, the valve 38 may be actuated via fluid pressure. In some examples, an air supply 66 may be in flow communication with the selector 40 (e.g., a pneumatic selector), which may be a pneumatic switch (e.g., a pneumatic valve) positioned to communicate with the valve 38 via the selector communication conduit 64 (e.g., an air conduit). The air supply 66, in some examples, may be provided by the chassis or vehicle to which the tank 10 is connected. In some examples, the air supply 66 may include air or one or more gasses provided at high pressure. In some examples, the high pressure may be provided by a high-pressure tank and/or a compressor, for example, associated with the chassis or vehicle to which the tank 10 is connected.

In some examples, the valve 38 may include a crude oil vapor valve configured to be activated to switch between the closed and open conditions via air pressure. In some examples, the valve 38 may be a dual-stage poppet valve configured to activate via 35 pounds per square inch of pressure or more. In some examples, the indicator 42 (e.g., a pneumatic indicator) may be configured to be pneumatically activated. For example, the selector 40, the selector communication conduit 64, and the indicator 42 may at least partially form a pneumatic circuit. The indicator 42 may be configured to provide one or more of a visual indication (e.g., illumination of a light), an audible indication (e.g., sounding of an alarm, siren, and/or beep), or a tactile indication (e.g., activation of a buzzing and/or vibrating of the pump switch 30, etc.). In some examples, the indication may be communicated to a fleet management site located at a geographic location remote from the tank 10, for example, via a transmitter (see also, for example, FIG. 7).

As shown in FIG. 4, some examples of the interlock 44 may be pneumatically activated, for example, via air pressure received from the valve 38 and/or the indicator 42, for example, as part of a pneumatic circuit. In some such examples, the interlock 44 may be a physical interlock, such as a rod or latch connected to a pneumatic actuator positioned to cause movement of the rod or latch upon receipt of a signal from the pneumatic circuit. In some examples, the physical interlock may include a biasing member (e.g., a spring) connected to the interlock 44 and positioned to bias the interlock 44 in a position and/or orientation that prevents the pump switch 30 from activating the one or more pumps 32, for example, unless the interlock 44 receives an air signal with sufficient pressure to overcome the biasing force of the biasing member, thereby facilitating operation of the pump switch 30 to activate the one or more pumps 32 to pump at least a portion of the asphalt from the tank 10. In some examples, the interlock 44 may be positioned to receive the pneumatic signal and cause an electric switch to prevent operation of the one or more pumps 32, unless the pneumatic switch is activated.

Figure 5:
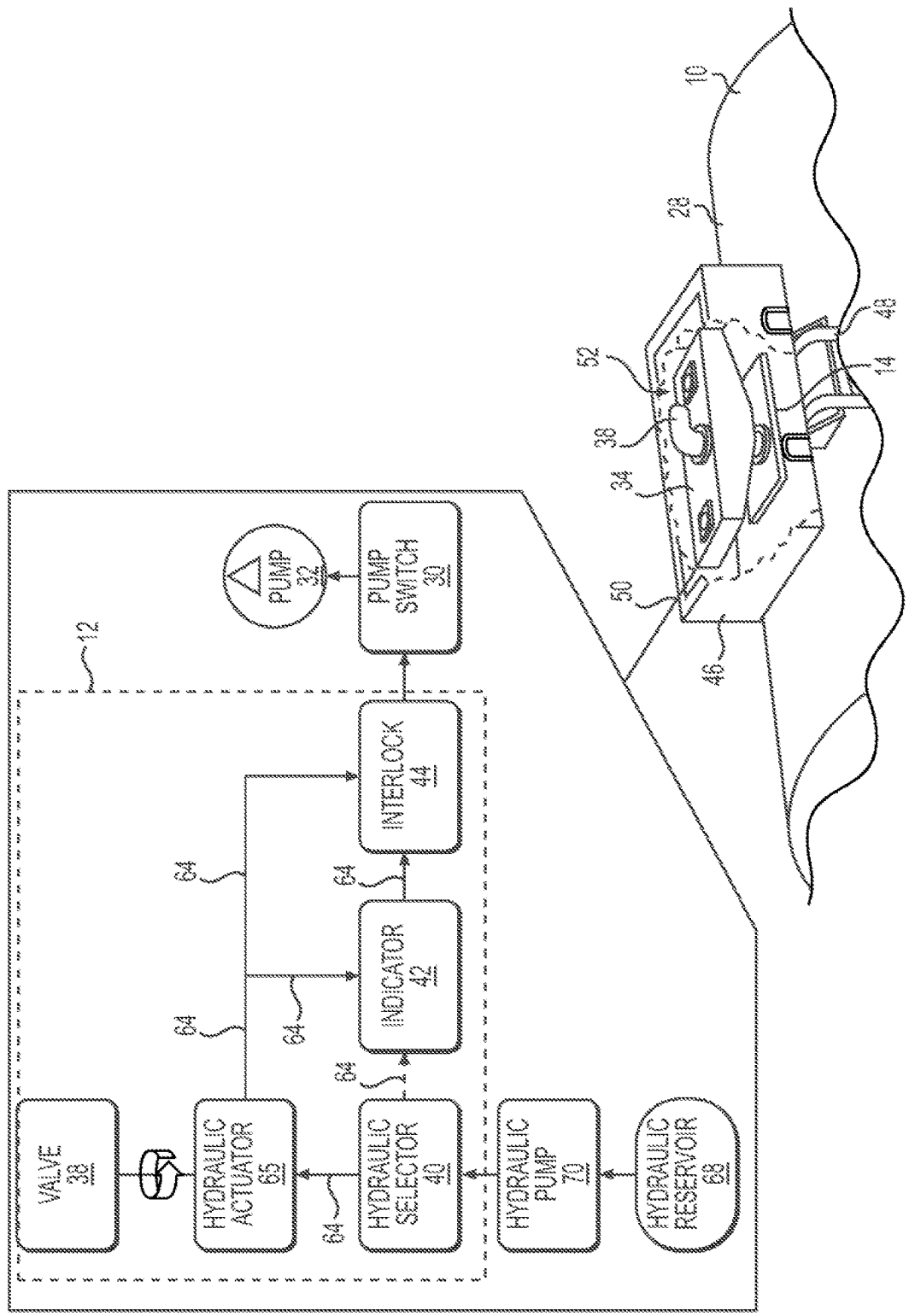
FIG. 5 is a partial perspective view of another example tank to enhance transporting asphalt and a schematic view of yet a further example system to vent a tank according to embodiments of the disclosure.

FIG. 5 is a partial perspective view of another example tank 10 to enhance transporting asphalt and a schematic view of yet a further example system 12 to vent a tank 10 according to embodiments of the disclosure. As shown in FIG. 5, in some examples, the system 12 may include a hydraulic reservoir 68 positioned to contain a supply of hydraulic fluid. The system 12 may also include a hydraulic pump 70 positioned to draw hydraulic fluid from the hydraulic reservoir 68 and pump the hydraulic fluid under pressure to the selector 40. The selector communication conduit 64 may be a hydraulic conduit. The selector 40 may be a hydraulic selector (e.g., a hydraulic valve or hydraulic switch) positioned to change the valve 38 between the closed condition and the open condition. In some examples, the valve 38 may be configured to be activated via receipt of hydraulic fluid under pressure. For example, the valve 38 may include a hydraulic actuator 65, such as a rod and cylinder-type actuator connected to the valve 38 and to cause the valve 38 to change between the closed and open conditions.

In some examples, the indicator 42 (e.g., a hydraulic indicator) may be configured to be hydraulically activated. For example, the selector 40, the selector communication conduit 64, and the indicator 42 may at least partially form a hydraulic circuit. The indicator 42 may be configured to provide one or more of a visual indication (e.g., illumination of a light), an audible indication (e.g., sounding of an alarm, siren, and/or beep), or a tactile indication (e.g., activation of a buzzing and/or vibrating of the pump switch 30). In some examples, the indication may be communicated to a fleet management site located at a geographic location remote from the tank 10, for example, via a transmitter.

As shown in FIG. 5, some examples of the interlock 44 may be hydraulically activated, for example, via hydraulic fluid under pressure received from the valve 38 and/or the indicator 42, for example, as part of the hydraulic circuit. In some such examples, the interlock 44 may be a physical interlock, such as a rod or latch connected to a hydraulic actuator positioned to cause movement of the rod or latch upon receipt of a signal from the hydraulic circuit. In some examples, the physical interlock may include a biasing member (e.g., a spring) connected to the interlock 44 and positioned to bias the interlock 44 in a position and/or orientation that prevents the pump switch 30 from activating the one or more pumps 32, for example, unless the interlock 44 receives a hydraulic signal with sufficient pressure to overcome the biasing force of the biasing member, thereby facilitating operation of pump switch 30 to activate the one or more pumps 32 to pump at least a portion of the asphalt from the tank 10. In some examples, the interlock 44 may be positioned to receive the hydraulic signal and cause an electric switch to prevent operation of the one or more pumps 32, unless the hydraulic switch is activated.

Figure 6:
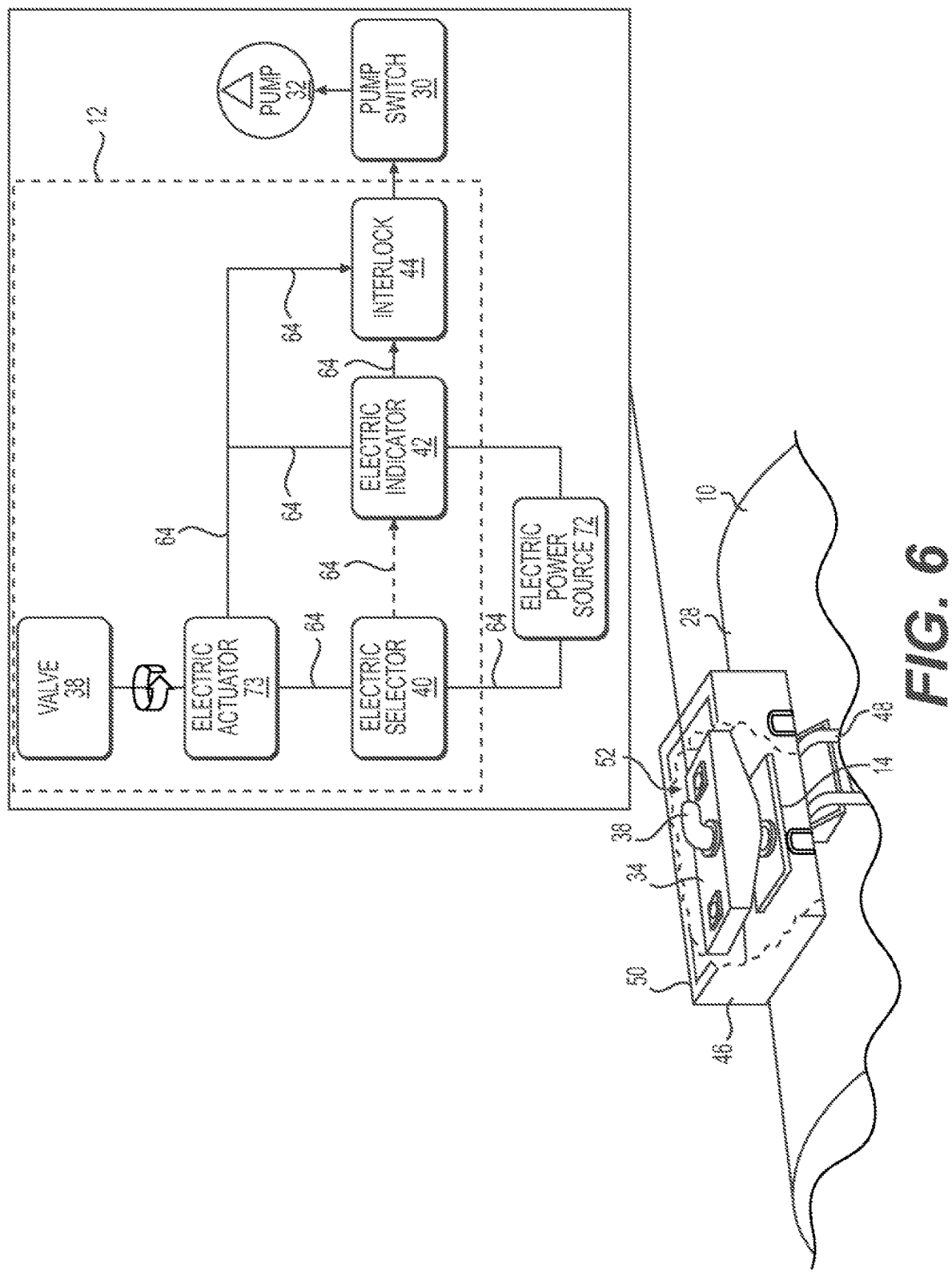
FIG. 6 is a partial perspective view of another example tank to enhance transporting asphalt and a schematic view of still another example system to vent a tank according to embodiments of the disclosure.

FIG. 6 is a partial perspective view of another example tank 10 to enhance transporting asphalt and a schematic view of still another example system 12 to vent a tank 10 according to embodiments of the disclosure. As shown in FIG. 6, in some examples, the system 12 may include an electric power source 72 to provide a supply of electric power for operation of one or more of the selector 40, the valve 38, the indicator 42, or the interlock 44. For example, the electric power source 72 may include one or more batteries and/or electric power supplied by the chassis and/or vehicle to which the tank 10 is connected. As shown in FIG. 6, the electric power source 72 may be positioned to supply electric power to the selector 40, which may be an electric selector, such as an electric switch. The selector communication conduit 64 may be an electric circuit, and the selector 40 may be positioned to change the valve 38 between the closed condition and the open condition. In some examples, the valve 38 may be configured to be activated via receipt of an electric signal from the selector 40. For example, the valve 38 may include an electric actuator 73, such a linear actuator and/or motor connected to the valve 38 and positioned to cause the valve 38 to change between the closed and open conditions.

In some examples, the indicator 42 (e.g., an electric indicator) may be configured to be electrically activated. For example, the selector 40, the selector communication conduit 64, and the indicator 42 may at least partially form an electric circuit, and the indicator 42 may be configured to provide one or more of a visual indication (e.g., illumination of a light), an audible indication (e.g., sounding of an alarm, siren, and/or beep), or a tactile indication (e.g., activation of a buzzing and/or vibrating of the pump switch 30). In some examples, the indication may be communicated to a fleet management site located at a geographic location remote from the tank 10, for example, via a transmitter As shown in FIG. 6, some examples of the interlock 44 may be electrically activated, for example, via an electric signal received from the valve 38 and/or the indicator 42, for example, as part of the electric circuit. In some such examples, the interlock 44 may be a physical interlock, such as a rod or latch connected to an electric actuator positioned to cause movement of the rod or latch upon receipt of a signal via the electric circuit. In some examples, the physical interlock may include a biasing member (e.g., a spring) connected to the interlock 44 and positioned to bias the interlock 44 in a position and/or orientation that prevents the pump switch 30 from activating the one or more pumps 32, for example, unless the interlock 44 receives an electric signal (e.g., to power the electric actuator) to overcome the biasing force of the biasing member, thereby facilitating operation of pump switch 30 to activate the one or more pumps 32 to pump at least a portion of the asphalt from the tank 10. In some examples, the interlock 44 may be configured to receive the electric signal and cause an electric switch to prevent operation of the one or more pumps 32, unless the electric switch is activated.

Figure 7:
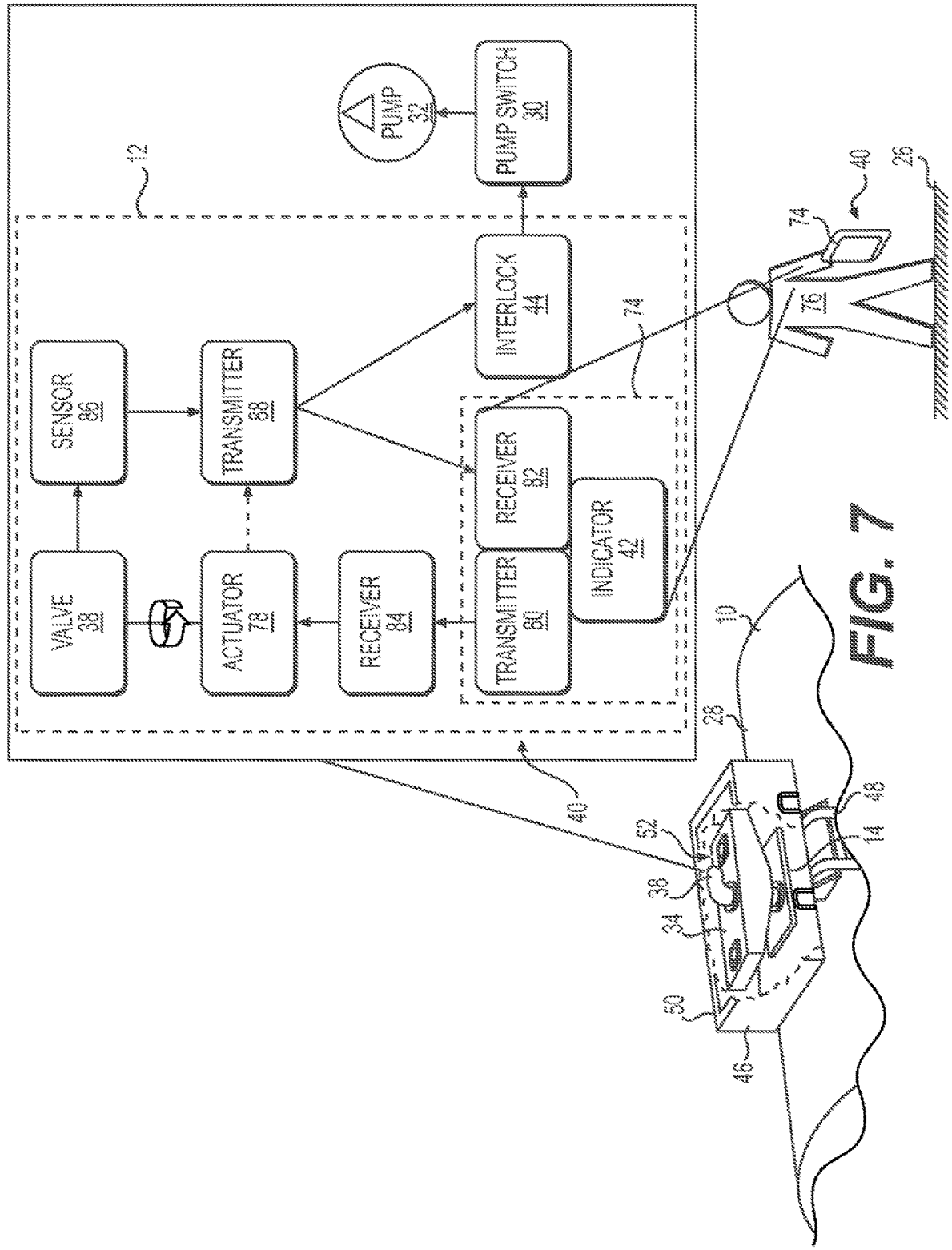
FIG. 7 is a partial perspective view of another example tank to enhance transporting asphalt and a schematic view of still another example system to vent a tank according to embodiments of the disclosure.

FIG. 7 is a partial perspective view of another example tank 10 to enhance transporting asphalt and a schematic view of still another example system 12 to vent a tank 10 according to embodiments of the disclosure. The example system 12 shown in FIG. 7 may include a computing device 74, such as a portable computing device (e.g., a laptop, tablet, smartphone, and/or a purpose-built portable controller) that acts as the selector 40. In some examples, the computing device 74 may be located at any geographic location remote from the tank 10, such as at a fleet management site. As shown, an operator or driver 76 (or a fleet operator located remotely from the tank 10) may use the computing device 74 to communicate with an actuator 78 connected to the valve 38 to cause the valve 38 to change between the closed condition and the open condition, for example, as described herein.

For example, the computing device 74 may include a transmitter 80 (e.g., a selector transmitter) and a receiver 82 (or a transceiver), and the operator or driver 76 may use the computing device 74 to communicate a signal to the actuator 78 to a receiver 84 connected to the actuator 78 and positioned to activate the actuator 78 to cause the valve 38 to change from the closed condition to the open condition. For example, the computing device 74 may include a graphical user interface to facilitate selection by the operator or driver 76 to cause the valve 38 to open.

The system 12 may include an electric power source configured to provide a supply of electric power for operation of one or more of the actuator 78, the valve 38, the indicator 42, or the interlock 44 (see, e.g., FIG. 6). For example, the electric power source may include one or more batteries and/or electric power supplied by the chassis and/or vehicle to which the tank 10 is connected.

As shown in FIG. 7, some examples of the system 12 may also include one or more sensors 86 configured to generate one or more signals indicative of whether the valve 38 is sufficiently open to effectively equalize the pressure in interior volume 11 of the tank 10 with the ambient pressure surrounding the tank 10 to prevent damage, implosion, and/or collapse when the one or more pumps 32 pump asphalt from the tank 10. The one or more sensors 86 may be communicatively connected to a transmitter 88 (e.g., a valve transmitter) configured to transmit one or more signals from the one or more sensors to the computing device 74 and/or the interlock 44, which may be an electrically activated interlock. In some examples, the transmitter 88 may be configured to receive one or more signals from the actuator 78 and/or the valve 38 indicative of the condition of the valve 38 (e.g., open or closed), and transmit one or more signals (e.g., one or more valve signals) for receipt by the receiver 82 associated with the computing device 74.

In some examples, the valve 38 may be configured to be activated via receipt of one or more signals from the computing device 74, which may serve as a selector. For example, the actuator 78 maybe an electric actuator, such as a linear actuator and/or motor connected to the valve 38 and positioned to cause the valve 38 to change between the closed and open conditions. In some such examples, the selector communication conduit 64 may be a communications link (wired and/or wireless) between the computing device 74, the receiver 84, the actuator 78, the valve 38, the transmitter 88, the receiver 82 of the computing device 74, and/or the interlock 44.

In some examples, the indicator 42 (e.g., an electric indicator) may be incorporated into the computing device 74. The indicator 42 may be configured to illicit indication of the valve 38 being sufficiently open via one or more of a visual indication, for example, illumination of a light, such as display of a message on the graphical user interface of the computing device 74, an audible indication, for example, sounding of an alarm, siren, beep, and/or other audible notification, a tactile indication, for example, activation of a buzzing and/or vibrating of the computing device 74. In some examples, the indication may be communicated to a fleet management site located at a geographic location remote from the tank 10, for example, via the transmitter 80 and/or the transmitter 88.

As shown in FIG. 7, the interlock 44 may be configured to receive one or more signals from the transmitter 88 associated with the sensor 86 and/or the actuator 78, which may electrically activate the interlock 44. In some such examples, the interlock 44 may be a physical interlock, such as a rod or latch connected to an electric actuator positioned to cause movement of the rod or latch upon receipt of a signal via the electric circuit. In some examples, the physical interlock may include a biasing member (e.g., a spring) connected to the interlock 44 and positioned to bias the interlock 44 in a position and/or orientation that prevents the pump switch 30 from activating the one or more pumps 32, for example, unless the interlock 44 receives an electric signal (e.g., to power the electric actuator) to overcome the biasing force of the biasing member, thereby facilitating operation of pump switch 30 to activate the one or more pumps 32 to pump at least a portion of the asphalt from the tank 10. In some examples, the interlock 44 may be configured to receive the electric signal and cause an electric switch to prevent operation of the one or more pumps 32, unless the electric switch is activated.

Figure 8:
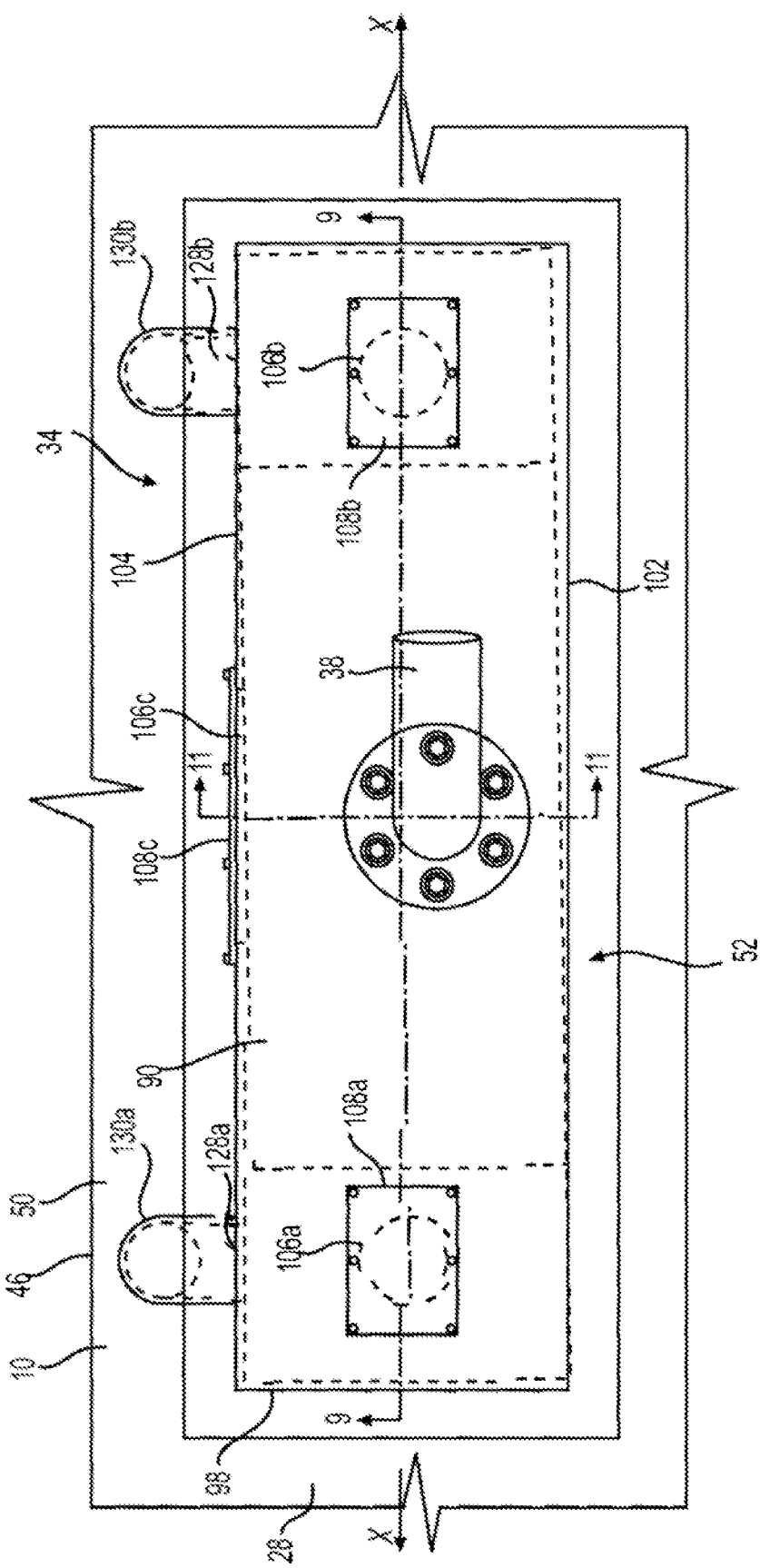
FIG. 8 is a partial top view of an example tank to enhance transporting asphalt, including a top view of an example vapor box according to embodiments of the disclosure.
Figure 9:
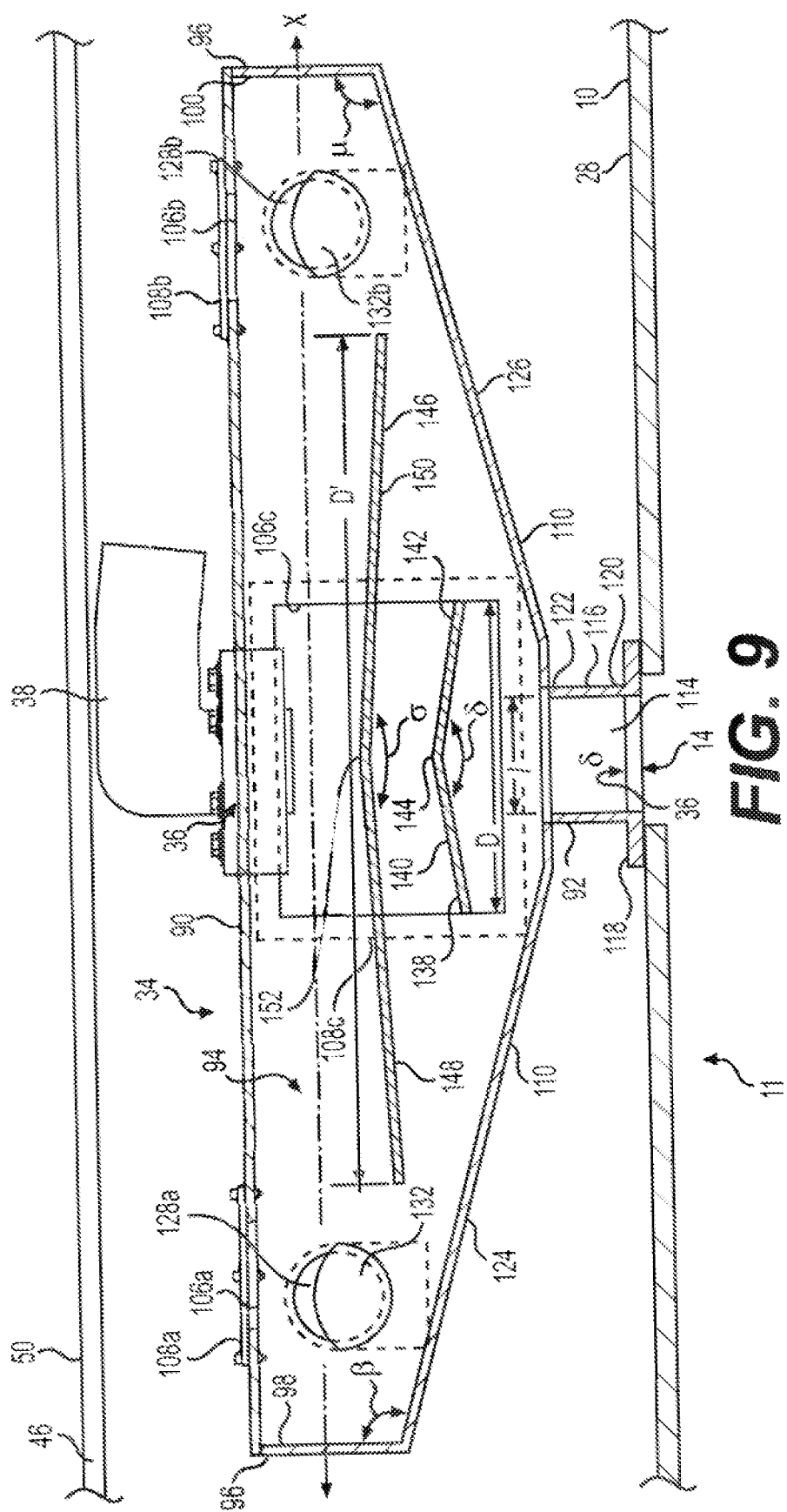
FIG. 9 is a partial side section view of an example tank to enhance transporting asphalt, including a partial side section view of the example vapor box taken along line 9-9 shown in FIG. 8 according to embodiments of the disclosure.

FIGS. 8, 9, 10, and 11 illustrate an example vapor box 34 according to embodiments of the disclosure. For example, FIG. 8 is a partial top view of an example tank 10 to enhance transporting asphalt, including a top view of an example vapor box 34, and FIG. 9 is a partial side section view of the example tank 10 to enhance transporting asphalt, including a partial side section view of the example vapor box 34 taken along line 9-9 shown in FIG. 8, according to embodiments of the disclosure.

As shown in FIGS. 8 and 9, the example vapor box 34 may include a cover 90 including the vent aperture 36 and an inlet 92 to connect to the tank 10 and provide fluid flow between the interior volume 11 of the tank 10 and an interior 94 of the vapor box 34. In some examples, the vapor box 34 may also include a barrier 96 extending between the cover 90 and the inlet 92, and the cover 90, the inlet 92, and the barrier 96 may at least partially define the interior 94 of the vapor box 34. As described herein, the valve 38 may be associated with the vent aperture 36 and may be positioned to provide fluid flow between the interior 94 of the vapor box 34 and an exterior of the vapor box 34 (e.g., to the ambient surroundings of the vapor box 34).

Figure 10:
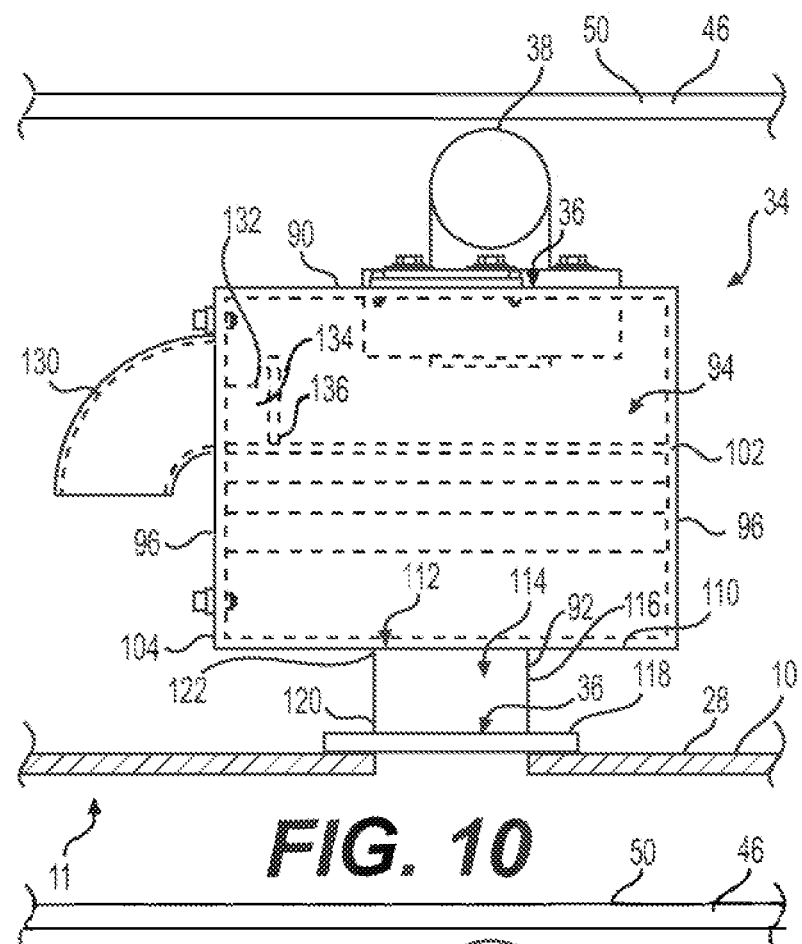
FIG. 10 is a partial end view of an example tank to enhance transporting asphalt, including an end view of the example vapor box shown in FIG. 8 according to embodiments of the disclosure.
Figure 11:
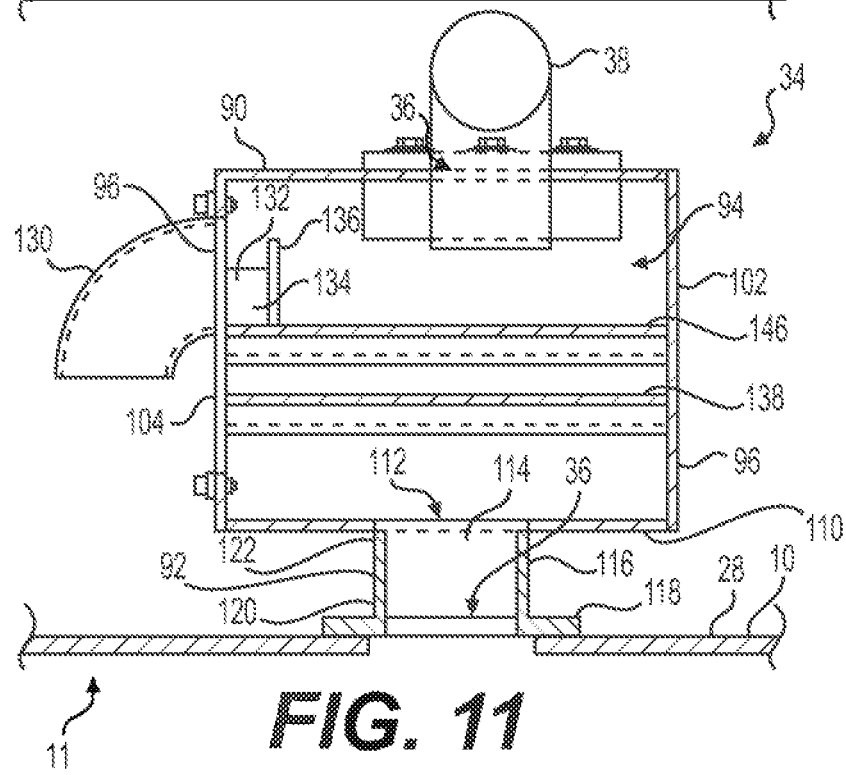
FIG. 11 is a partial end section view of an example tank to enhance transporting asphalt, including a partial end section view of the example vapor box taken along line 11-11 shown in FIG. 8 according to embodiments of the disclosure.

In some examples, as shown in FIG. 9, the barrier 96 may include a first end wall 98 and a second end wall 100 opposite the first end wall 98. As shown in FIGS. 10 and 11, the barrier 96 may also include a first side wall 102 extending longitudinally between the first end wall 98 and the second end wall 100, and a second side wall 104 opposite the first side wall 102 and extending longitudinally between the first end wall 98 and the second end wall 100. In some examples, one or more of the first end wall 98, the second end wall 100, the first side wall 102, or the second side wall 104 may be substantially planar. It is contemplated that one or more of the first end wall 98, the second end wall 100, the first side wall 102, or the second side wall 104 may have non-planar aspects.

As shown in FIGS. 8 and 9, in some examples of the vapor box 34, the cover 90 and/or the barrier 96 may include an inspection opening 106 to facilitate a view of at least a portion of the interior 94 of the vapor box 34. For example, the cover 90 includes two inspection openings 106a and 106b, and the example barrier 96 (e.g., the second side wall 104) includes an inspection opening 106c. In addition, the example vapor box 34 also includes an inspection opening cover 108 removably connected to the vapor box 34, such that the inspection opening cover 108 at least partially blocks the one or more inspection openings 106 and is separable from the vapor box 34 to facilitate the view of the at least a portion of the interior 94 of the vapor box 34. For example, as shown in FIGS. 8 and 9, inspection opening covers 108a, 108b, and 108c may be connected to the cover 90 and the barrier 96, for example, via fasteners (e.g., screws and/or bolts) to block the inspection openings 106a, 106b, and 106c, respectively.

Removal of one or more of the inspection opening covers 108 may provide access to the interior 94 of the vapor box for inspection, for example, to determine whether asphalt has built-up in the interior 94 of the vapor box 34, and if so, may facilitate cleaning of the interior 94 of the vapor box 34 to remove at least some of the asphalt from the interior 94 of the vapor box 34. For example, during transport of asphalt in the tank 10, asphalt may slosh and/or splash up into the interior 94 of the vapor box 34. Over time, the build-up of asphalt in the interior 94 of the vapor box 34 may inhibit the effectiveness of the vapor box 34, potentially preventing the valve 38 from opening substantially or fully, which may lead to unintended damage to the tank 10, for example, during pumping of asphalt from the interior volume 11 of the tank 10. Periodic inspection and/or cleaning of the interior 94 of the vapor box 34 may reduce the likelihood or prevent the occurrence of such situations.

As shown in FIG. 9-11, some examples of the vapor box 34 may also include a base 110 connected to the barrier 96 and defining an inlet opening 112. The inlet 92 may be connected to the base 110 and define a passage 114 between the interior volume 11 of the tank 10 and the inlet opening 112. For example, as shown, the inlet 92 may include a tubular member 116 connected to the base 110 and the tank 10 to provide fluid flow between the interior volume 11 of the tank 10 and the interior 94 of the vapor box 34. In the example shown, a flange 118 is connected to a first end 120 of the tubular member 116 and the tank 10 (e.g., the upper surface 28), and a second end 122 of the tubular member 116 is connected to the base 110 of the vapor box 34, thereby connecting the vapor box 34 to the tank 10, such that fluid flow exists between the interior volume 11 of the tank 10 and the interior 94 of the vapor box 34.

As shown in FIG. 9, for some examples of the base 110 of the vapor box 34, the base 110 may include a first portion 124 extending from the barrier 96 (e.g., from the first end wall 98) toward the inlet opening 112 at an angle β oblique with respect to at least a portion of the barrier 96 (e.g., the first end wall 98). The base 110 may also include a second portion 126 extending from the barrier 96 (e.g., from the second end wall 100) toward the inlet opening 112 at an angle μ oblique with respect to at least a portion of the barrier 96 (e.g., the second end wall 100) and the first portion 124. For example, the vapor box 34 may define a longitudinal vapor box axis X extending between the first end wall 98 of the vapor box 34 and the second end wall 100 of the vapor box 34. In some examples, the first portion 124 of the base 110 may extend from the first end wall 98 of the vapor box 34 toward the inlet opening 112, and the second portion 126 of the base 110 may extend from the second end wall 100 of the vapor box 34 toward the inlet opening 112.

In some examples, the first portion 124 of the base 110 and the second portion 126 of the base 110 may at least partially define a v-shaped cross-section viewed perpendicular relative to the longitudinal vapor box axis X (see FIG. 9) and may cause material to flow toward the inlet opening 112. For example, during transport of asphalt, asphalt may slosh or splash up into the inlet opening 112 and the interior 94 of the vapor box 34. The example configuration of the first portion 124 and second portion 126 of the base 110 may cause any asphalt that sloshes or splashes into the interior 94 of the vapor box 34 to flow toward the inlet opening 112 and out of the interior 94 of the vapor box 34. In some examples, one or more of the first portion 124 or the second portion 126 may be substantially planar, for example, as shown in FIG. 9. It is contemplated that one or more of the first portion 124 or the second portion 126 may have non-planar aspects.

FIG. 10 is a partial end view of an example tank 10 to enhance transporting asphalt, including an end view of the example vapor box 34 shown in FIG. 8, and FIG. 11 is a partial end section view of the example tank 10, including a partial end section view of the example vapor box 34 taken along line 11-11 shown in FIG. 8 according to embodiments of the disclosure. As shown in FIGS. 10 and 11, the first side wall 102 and/or the second side wall 104 may define one or more vent openings 128 to provide fluid flow between the interior 94 of the vapor box 34 and exterior of the vapor box 34, (e.g., the ambient air surrounding the exterior of the vapor box 34). For example, as shown in FIGS. 8 and 9, some examples may include two vent openings 128a and 128b in the second side wall 104 of the vapor box 34. In some examples, a duct 130 may be associated with the exterior of the vapor box 34 and the one or more vent openings 128. The example shown in FIGS. 9 and 10 includes a first duct 130a associated with the first vent opening 128a, and a second duct 130b associated with the second vent opening 128b. The one or more ducts 130 may redirect flow from a first flow direction to a second low direction different than the first flow direction. For example, each of the example ducts 130a and 130b shown in FIGS. 10 and 11 includes a ninety-degree elbow mounted to the second side wall 104 of the vapor box 34, such that vapor initially exiting via the vent openings 128a and 128b flows substantially horizontally and thereafter is redirected to flow substantially vertically downward.

In some examples, the vapor box 34 may also include a restrictor 132 associated with the interior 94 of the vapor box 34 and the one or more vent openings 128. The example shown in FIGS. 9-11 includes a first restrictor 132a associated with the first vent opening 128a, and a second restrictor 132b associated with the second vent opening 128b. The one or more restrictors 132 may at least partially obstruct the associated vent opening 128. For example, the example restrictors 132 shown define a length of half pipe 134 connected to an interior side of the second side wall 104 and extending inward toward the first side wall 102 and terminating at a restrictor flange 136. In some examples, the half pipe 134 and flange 136 may reduce the likelihood that asphalt sloshed or splashed up into the interior 94 of the vapor box 34 during transport will exit the vapor box 34 via the vent openings 128.

As shown in FIGS. 9-11, some examples of the vapor box 34 may also include a first baffle 138 between the base 110 and the cover 90 and extending between the first side wall 102 and the second side wall 104. As shown, in some examples, the first baffle 128 may be substantially longitudinally aligned with the inlet 92. In some examples, the first baffle 138 may define a first baffle dimension D in a direction parallel to the longitudinal vapor box axis X exceeding an inlet dimension I defined by the inlet 92 in the direction parallel to the longitudinal vapor box axis X. For example, the first baffle dimension D may be greater than twice the inlet dimension I.

As shown in FIG. 9, the first baffle 138 may include a first baffle portion 140 and a second baffle portion 142 connected to the first baffle portion 140. In some examples, the first baffle portion 140 and the second baffle portion 142 may define an obtuse first included angle & having a first baffle vertex 144 extending between the first side wall 102 and the second side wall 104 (see FIGS. 9 and 11). As shown in FIG. 9, in some examples, the first included angle & defined by the first baffle 138 opens toward the inlet 92.

As shown in FIGS. 9-11, the vapor box 34 may also include a second baffle 146 between the first baffle 138 and the cover 90 and extending between the first side wall 102 and the second side wall 104. In some examples, the second baffle 146 may be substantially longitudinally aligned with the first baffle 138 and/or the inlet 92. The second baffle 146 may define a second baffle dimension D' in a direction parallel to the longitudinal vapor box axis X exceeding the inlet dimension I defined by the inlet 92 in the direction parallel to the longitudinal vapor box axis X. In some examples, the first baffle dimension D may exceed the inlet dimension I, and in some examples, the second baffle dimension D' may exceed the first baffle dimension D. For example, the second baffle dimension D' may be greater than twice the first baffle dimension D. Other relative sizes and dimensions are contemplated.

As shown in FIG. 9, the second baffle 146 may include a first baffle portion 148 and a second baffle portion 150 connected to the first baffle portion 148. In some examples, the first baffle portion 148 and the second baffle portion 150 of the second baffle 146 may define an obtuse second included angle σ having a second baffle vertex 144 extending between the first side wall 102 and the second side wall 104 (see FIGS. 9 and 11). As shown in FIG. 9, in some examples, the second included angle σ defined by the second baffle 146 may open toward first baffle 138 and/or the inlet 92.

In some examples, the first baffle 138 and/or the second baffle 146 may at least partially define an inverted v-shaped cross-section viewed perpendicular relative to the longitudinal vapor box axis X (e.g., see FIG. 9) and may cause material to flow toward the inlet opening 112. For example, during transport of asphalt when positioned in the tank, asphalt may slosh or splash up into the inlet opening 112 and the interior 94 of the vapor box 34. The example configuration of the first baffle 138 and/or the second baffle 146 may prevent asphalt form sloshing or splashing up onto the inlet of the valve 38 and/or cause the asphalt in the interior 94 to flow down toward the inlet opening 112 and out of the interior 94 of the vapor box 34. In some examples, one or more of the portions of the first baffle 138 and/or one or more portions of the second baffle 146 may be substantially planar, for example, as shown in FIG. 9. It is contemplated that one or more of the portions of the first baffle 138 and/or the second baffle 146 may have non-planar aspects.

Having now described some illustrative embodiments of the invention, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Those skilled in the art should appreciate that the parameters and configurations described herein are exemplary and that actual parameters and/or configurations will depend on the specific application in which the systems and techniques of the invention are used. Those skilled in the art should also recognize or be able to ascertain, using no more than routine experimentation, equivalents to the specific embodiments of the invention. It is, therefore, to be understood that the embodiments described herein are presented by way of example only and that, within the scope of any appended claims and equivalents thereto, the invention may be practiced other than as specifically described.

Furthermore, the scope of the present disclosure shall be construed to cover various modifications, combinations, additions, alterations, etc., above and to the above-described embodiments, which shall be considered to be within the scope of this disclosure. Accordingly, various features and characteristics as discussed herein may be selectively interchanged and applied to other illustrated and non-illustrated embodiment, and numerous variations, modifications, and additions further can be made thereto without departing from the spirit and scope of the present invention as set forth in the appended claims.

What is claimed is:

1. A system to vent a tank to enhance transporting asphalt when positioned in the tank, the system comprising:
   a vapor box to connect to a tank, the vapor box comprising:
      a cover including one or more vent apertures,
      an inlet connected to the tank and positioned to provide fluid flow between an interior of the tank and an interior of the vapor box,
      a barrier extending between the cover and the inlet, the interior of the vapor box at least partially defined by the cover, the inlet, and the barrier,
      a base connected to the barrier, the base including an opening configured to connect to an inlet of the tank, the inlet of the tank having a tubular member connected to the opening of the base and extending between the vapor box and the tank, the tubular member having a first end connected to the tank and a second end connected to the base, and
      a flange connected to the first end of the tubular member;
   a valve associated with the one or more vent apertures and positioned to provide fluid flow between the interior of the vapor box and an exterior of the vapor box; and
   a selector positioned spaced from and in communication with the valve and to cause the valve to change between an open condition providing fluid flow between the interior of the vapor box and the exterior of the vapor box via the one or more vent apertures and a closed condition preventing fluid flow between the interior of the vapor box and the exterior of the vapor box via the one or more vent apertures.

2. The system of claim 1, wherein one or more of the cover or the barrier defines an inspection opening positioned to facilitate a view of at least a portion of the interior of the vapor box.

3. The system of claim 2, further comprising an inspection opening cover positioned to be removably connected to the vapor box such that the inspection opening cover at least partially blocks the inspection opening and is separable from the vapor box to facilitate the view of the at least a portion of the interior of the vapor box.

4. The system of claim 1, wherein the vapor box further comprises a base connected to the barrier and defining an opening, and the base having (a) a first portion extending from the barrier toward the opening at an angle oblique with respect to at least a portion of the barrier and (b) a second portion extending from the barrier toward the opening at an angle oblique with respect to at least a portion of the barrier and the first portion.

5. The system of claim 4, wherein the vapor box defines a longitudinal vapor box axis extending between a first end of the vapor box and a second end of the vapor box opposite the first end of the vapor box, wherein the first portion of the base extends from the first end of the vapor box toward the opening, and wherein the second portion of the base extends from the second end of the vapor box toward the opening.

6. The system of claim 5, wherein the first portion of the base and the second portion of the base at least partially define a v-shaped cross-section viewed perpendicular relative to the longitudinal vapor box axis and positioned to cause material to flow toward the opening.

7. The system of claim 1, wherein the barrier comprises: a first end wall, a second end wall opposite the first end wall, a first side wall extending longitudinally between the first end wall and the second end wall, and a second side wall opposite the first side wall and extending longitudinally between the first end wall and the second end wall.

8. The system of claim 7, wherein one or more of the first side wall or the second side wall defines an inspection opening positioned to facilitate a view of at least a portion of the interior of the vapor box.

9. The system of claim 7, wherein one or more of the first side wall or the second side wall defines a vent opening positioned to provide fluid flow between the interior of the vapor box and the exterior of the vapor box.

10. The system of claim 9, further comprising a duct associated with the vent opening and extending exterior to the vapor box, the duct positioned to redirect flow from a substantially horizontal direction internal to the interior of the vapor box to a substantially vertical direction external to the exterior to the vapor box, and a restrictor to at least partially obstruct the vent opening.

11. The system of claim 7, further comprising a first baffle between the base and the cover and extending between the first side wall and the second side wall, wherein the vapor box defines a longitudinal vapor box axis extending between the first end wall and the second end wall, wherein the first baffle defines a first baffle dimension in a direction parallel to the longitudinal vapor box axis exceeding an inlet dimension defined by the inlet in the direction parallel to the longitudinal vapor box axis, and wherein the first baffle dimension is greater than twice the inlet dimension.

12. The system of claim 11, wherein the first baffle comprises a first baffle portion and a second baffle portion connected to the first baffle portion, the first baffle portion and the second baffle portion defining an obtuse first included angle having a first baffle vertex extending between the first side wall and the second side wall, and wherein the first included angle defined by the first baffle opens toward the inlet.

13. The system of claim 7, further comprising a first baffle between the base and the cover and extending between the first side wall and the second side wall, wherein the vapor box defines a longitudinal vapor box axis extending between the first end wall and the second end wall, the system further comprising a second baffle between the first baffle and the cover and extending between the first side wall and the second side wall, and wherein the second baffle is substantially longitudinally aligned with one or more of the first baffle or the inlet.

14. The system of claim 7, further comprising a first baffle between the base and the cover and extending between the first side wall and the second side wall, wherein the vapor box defines a longitudinal vapor box axis extending between the first end wall and the second end wall, and wherein a second baffle defines a second baffle dimension in a direction parallel to the longitudinal vapor box axis exceeding an inlet dimension defined by the inlet in the direction parallel to the longitudinal vapor box axis.

15. The system of claim 14, wherein the second baffle comprises a third baffle portion and a fourth baffle portion connected to the third baffle portion, the third baffle portion and the fourth baffle portion defining an obtuse second included angle having a second baffle vertex extending between the first side wall and the second side wall, and wherein the second included angle defined by the second baffle opens toward one or more of the first baffle or the inlet.

16. The system of claim 1, wherein the selector comprises one or more of a physical switch or virtual switch.

17. The system of claim 1, wherein the valve connects to an area of the cover surrounding the one of the one or more vent apertures such that the valve extends through the cover, and wherein a portion of the valve resides exterior to the vapor box.

18. A system to vent a tank to enhance transporting asphalt when positioned in the tank, the system comprising:
a vapor box to connect to an upper surface of a tank, the vapor box comprising:
a cover including a vent aperture,
an inlet connected to the tank and positioned to provide fluid flow between an interior of the tank and an interior of the vapor box, and
a barrier extending between the cover and the inlet, the interior of the vapor box at least partially defined by the cover, the inlet, and the barrier;
a valve (a) associated with the vent aperture, (b) positioned to extend through the cover such that a portion of the valve resides in the interior of the vapor box and another portion of the valve resides in an exterior of the vapor box, and (c) configured to provide fluid flow between the interior of the vapor box and the exterior of the vapor box; and
a selector positioned spaced from and in communication with the valve and to cause the valve to change between (a) an open condition providing, during off-loading from the tank, (i) pressure equalization between the interior of the tank and the exterior of the tank and (ii) vapor flow between the interior of the vapor box and the exterior of the vapor box via the vent aperture and (b) a closed condition preventing fluid flow between the interior of the vapor box and the exterior of the vapor box via the vent aperture.

19. The system of claim 18, wherein the selector comprises a switch.

20. A system to vent a tank to enhance transporting asphalt when positioned in the tank, the system comprising:
a vapor box to connect to a tank, the vapor box comprising:
a cover including one or more vent apertures,
an inlet connected to the tank and positioned to provide fluid flow between an interior of the tank and an interior of the vapor box, and
a barrier extending between the cover and the inlet, the interior of the vapor box at least partially defined by the cover, the inlet, and the barrier;
a valve associated with the one or more vent apertures, positioned to extend through the cover such that a portion of the valve resides exterior to the vapor box, and configured to provide fluid flow between the interior of the vapor box and an exterior of the vapor box; and
a selector positioned spaced from and in communication with the valve and to cause the valve to change between an open condition providing fluid flow between the interior of the vapor box and the exterior of the vapor box via the one or more vent apertures and a closed condition preventing fluid flow between the interior of the vapor box and the exterior of the vapor box via the one or more vent apertures.

21. The system of claim 20, wherein the vapor box comprises a base connected to the barrier, the base including an opening configured to connect to a tubular member of the inlet to define a passage between the interior of the tank and the interior of the vapor box.

22. A system to vent a tank to enhance transporting asphalt when positioned in the tank, the system comprising:
a vapor box to connect to a tank, the vapor box comprising:
a cover including one or more vent apertures,
an inlet to connect to the tank and be positioned to provide fluid flow between an interior of the tank and an interior of the vapor box,
a barrier extending between the cover and the inlet, the interior of the vapor box at least partially defined by the cover, the inlet, and the barrier, and
a base connected to the barrier and defining an opening, the base having (a) a first portion extending from the barrier toward the opening at an angle oblique with respect to at least a portion of the barrier and (b) a second portion extending from the barrier toward the opening at an angle oblique with respect to at least a portion of the barrier and the first portion;
a valve associated with the one or more vent apertures and positioned to provide fluid flow between the interior of the vapor box and an exterior of the vapor box; and
a selector positioned spaced from and in communication with the valve, thereby in operation to cause the valve to change between an open condition providing fluid flow between the interior of the vapor box and the exterior of the vapor box via the one or more vent apertures and a closed condition preventing fluid flow between the interior of the vapor box and the exterior of the vapor box via the one or more vent apertures.

23. The system of claim 22, wherein the vapor box defines a longitudinal vapor box axis extending between a first end of the vapor box and a second end of the vapor box, wherein the first portion of the base extends from the first end of the vapor box toward the opening, and wherein the second portion of the base extends from the second end of the vapor box toward the opening.

24. The system of claim 23, wherein the first portion of the base and the second portion of the base at least partially define a V-shaped cross-section viewed perpendicular relative to the longitudinal vapor box axis and positioned to cause material to flow toward the opening.

25. A system to vent a tank to enhance transporting asphalt when positioned in the tank, the system comprising:
a vapor box to connect to a tank, the vapor box comprising:
a cover including one or more vent apertures,
an inlet to connect to the tank and be positioned to provide fluid flow between an interior of the tank and an interior of the vapor box,
a barrier extending between the cover and the inlet, the interior of the vapor box at least partially defined by the cover, the inlet, and the barrier, barrier including: a first end wall, a second end wall opposite the first end wall, a first side wall extending longitudinally between the first end wall and the second end wall, and a second side wall opposite the first side wall and extending longitudinally between the first end wall and the second end wall,
a first baffle disposed between a base and the cover and extending between the first side wall and the second side wall, the vapor box defining a longitudinal vapor box axis extending between the first end wall and the second end wall, and
a second baffle defining a second baffle dimension in a direction parallel to the longitudinal vapor box axis exceeding an inlet dimension defined by the inlet in the direction parallel to the longitudinal vapor box axis;
a valve associated with the one or more vent apertures and positioned to provide fluid flow between the interior of the vapor box and an exterior of the vapor box; and
a selector positioned spaced from and in communication with the valve, thereby when operated to cause the valve to change between an open condition providing fluid flow between the interior of the vapor box and the exterior of the vapor box via the one or more vent apertures and a closed condition preventing fluid flow between the interior of the vapor box and the exterior of the vapor box via the one or more vent apertures.

26. The system of claim 25, further comprising a first baffle positioned between the base and the cover and extending between the first side wall and the second side wall, wherein the vapor box defines a longitudinal vapor box axis extending between the first end wall and the second end wall, wherein the first baffle defines a first baffle dimension in a direction parallel to the longitudinal vapor box axis exceeding an inlet dimension defined by the inlet in the direction parallel to the longitudinal vapor box axis, and wherein the first baffle dimension is greater than twice the inlet dimension.

27. The system of claim 26, wherein the first baffle comprises a first baffle portion and a second baffle portion connected to the first baffle portion, the first baffle portion and the second baffle portion defining an obtuse first included angle having a first baffle vertex extending between the first side wall and the second side wall, and wherein the first included angle defined by the first baffle opens toward the inlet.

28. The system of claim 25, wherein the vapor box defines a longitudinal vapor box axis extending between the first end wall and the second end wall, the second baffle positioned a second baffle between the first baffle and the cover and extending between the first side wall and the second side wall, and wherein the second baffle is substantially longitudinally aligned with one or more of the first baffle or the inlet.

29. The system of claim 25, wherein the second baffle comprises a third baffle portion and a fourth baffle portion connected to the third baffle portion, the third baffle portion and the fourth baffle portion defining an obtuse second included angle having a second baffle vertex extending between the first side wall and the second side wall, and wherein the second included angle defined by the second baffle opens toward one or more of the first baffle or the inlet.

30. The system of claim 25, wherein the base is connected to the barrier and the base includes an opening configured to connect to an inlet of the tank.

31. The system of claim 30, wherein the inlet of the tank comprises a tubular member connected to the opening of the base and extending between the vapor box and the tank, the system further comprising a flange connected to a first end of the tubular member and connected to the tank, and wherein a second end of the tubular member is connected to the base.

* * * * *